(12) United States Patent
Moriya

(10) Patent No.: US 11,487,390 B2
(45) Date of Patent: Nov. 1, 2022

(54) INFORMATION PROCESSING APPARATUS AND CONTROL METHOD OF INFORMATION PROCESSING APPARATUS

(71) Applicant: SONY CORPORATION, Tokyo (JP)

(72) Inventor: Shigeru Moriya, Tokyo (JP)

(73) Assignee: SONY CORPORATION, Tokyo (JP)

( * ) Notice: Subject to any disclaimer, the term of this patent is extended or adjusted under 35 U.S.C. 154(b) by 412 days.

(21) Appl. No.: 16/489,217

(22) PCT Filed: Feb. 5, 2018

(86) PCT No.: PCT/JP2018/003745
§ 371 (c)(1),
(2) Date: Aug. 27, 2019

(87) PCT Pub. No.: WO2018/179837
PCT Pub. Date: Oct. 4, 2018

(65) Prior Publication Data
US 2020/0019739 A1    Jan. 16, 2020

(30) Foreign Application Priority Data

Mar. 28, 2017  (JP) .............................. JP2017-063189

(51) Int. Cl.
*G06F 3/044*    (2006.01)
*A63F 13/214*    (2014.01)
(Continued)

(52) U.S. Cl.
CPC ............ *G06F 3/044* (2013.01); *A63F 13/214* (2014.09); *A63F 13/235* (2014.09);
(Continued)

(58) Field of Classification Search
CPC ........ G06F 3/044; A63F 13/214; A63F 13/20; A63F 13/2145
See application file for complete search history.

(56) References Cited

U.S. PATENT DOCUMENTS

2012/0154324 A1  6/2012  Wright et al.
2014/0098038 A1* 4/2014  Paek ..................... G06F 1/1692
                                                      345/173
(Continued)

FOREIGN PATENT DOCUMENTS

CN      103034358 A    4/2013
CN      103984432 A    8/2014
(Continued)

OTHER PUBLICATIONS

Extended European Search Report of EP Application No. 18775272. 0, dated Feb. 26, 2020, 11 pages.

(Continued)

*Primary Examiner* — Thomas J Hong
*Assistant Examiner* — Carl V Larsen
(74) *Attorney, Agent, or Firm* — Chip Law Group

(57) ABSTRACT

An information processing apparatus using proximity wireless communication is provided. The information processing apparatus includes a detection unit that includes a plurality of capacitance sensors arranged in a two-dimensional array along an operation surface and a recognition unit that recognizes an object placed on the operation surface on the basis of a detection result of the detection unit. The recognition unit recognizes a position and a direction of the capacitance sensor on which the metal portion included in the object is placed on the basis of the detection result obtained by discarding a detection value less than a predetermined threshold and recognizes a position and a direction less than an interval between the capacitance sensors in the metal portion on the basis of the detection result in which the detection value less than the predetermined threshold is not discarded.

11 Claims, 20 Drawing Sheets

(51) Int. Cl.
  *A63F 13/235* (2014.01)
  *G06K 7/10* (2006.01)
  *A63F 13/2145* (2014.01)
  *A63F 13/20* (2014.01)

(52) U.S. Cl.
  CPC .......... *G06K 7/10366* (2013.01); *A63F 13/20* (2014.09); *A63F 13/2145* (2014.09); *A63F 2300/1031* (2013.01); *A63F 2300/1075* (2013.01)

(56) References Cited

U.S. PATENT DOCUMENTS

| | | | |
|---|---|---|---|
| 2014/0210780 A1* | 7/2014 | Lee | G06F 3/0445 345/174 |
| 2015/0153887 A1 | 6/2015 | Kim et al. | |
| 2016/0162036 A1* | 6/2016 | Shi | G06F 3/04883 345/174 |
| 2016/0180734 A1* | 6/2016 | Shi | A63F 13/77 434/169 |
| 2018/0113527 A1* | 4/2018 | Klein | G06F 3/0393 |
| 2018/0140946 A1* | 5/2018 | Ueno | G07F 17/3211 |

FOREIGN PATENT DOCUMENTS

| | | |
|---|---|---|
| CN | 104951124 A | 9/2015 |
| CN | 107615234 A | 1/2018 |
| EP | 2575012 A2 | 4/2013 |
| EP | 2645216 A1 | 10/2013 |
| EP | 2924547 A1 | 9/2015 |
| JP | 2005-296483 A | 10/2005 |
| JP | 2015-106418 A | 6/2015 |
| JP | 2016-066153 A | 4/2016 |
| JP | 2016-177814 A | 10/2016 |
| KR | 10-2014-0095734 A | 8/2014 |
| WO | 2011/014580 A1 | 2/2011 |
| WO | 2016/018126 A1 | 2/2016 |
| WO | 2016/074465 A1 | 5/2016 |
| WO | 2016/185768 A1 | 11/2016 |

OTHER PUBLICATIONS

International Search Report and Written Opinion of PCT Application No. PCT/JP2018/003745, dated Mar. 6, 2018, 11 pages of ISRWO.

Office Action for EP Patent Application No. 18775272.0, dated Nov. 26, 2021, 10 pages of Office Action.

Office Action for JP Patent Application No. 2019-508676, dated Sep. 28, 2021, 08 pages of English Translation and 05 pages of Office Action.

* cited by examiner

INFORMATION PROCESSING APPARATUS AND CONTROL METHOD OF INFORMATION PROCESSING APPARATUS

CROSS REFERENCE TO RELATED APPLICATIONS

This application is a U.S. National Phase of International Patent Application No. PCT/JP2018/003745 filed on Feb. 5, 2018, which claims priority benefit of Japanese Patent Application No. JP 2017-063189 filed in the Japan Patent Office on Mar. 28, 2017. Each of the above-referenced applications is hereby incorporated herein by reference in its entirety.

TECHNICAL FIELD

The technology disclosed in the present specification relates to an information processing apparatus using proximity wireless communication and a control method of the information processing apparatus.

BACKGROUND ART

In the past, plays using toys such as tops, pogs, a cup and ball, spinning tops, that is, objects have been popular. In recent years, with development of information technology, opportunities for playing by using objects are reduced. Instead of this, opportunities for enjoying games by using an information terminal such as a smartphone and a tablet have been increased regardless of an age and sex of the people.

On the other hand, an attempt (project) for integrating a digital game executed on the information terminal with a play by using objects is made. Specifically, digital information which is originally virtual information such as characters, weapons, spoils, and the like used in the digital game can be used as existing tangible objects such as cards and figures.

For example, a Radio Frequency IDentifier (RFID) tag is built in or embedded in an object such as a card and a figure, and a reader/writer for a tag is externally and wiredly or wirelessly connected to an information terminal such as a smartphone and a tablet (or game machine). A user who is a player of the game places the card and the figure on the reader/writer at an appropriate timing during the game. Then, the information terminal reads information from the RFID tag in the card or the figure via the reader/writer or rewrites the information in the RFID tag according to the progress in the game being executed (growth of characters, exhaustion of weapons, acquisition of spoils, and the like) (for example, refer to Patent Document 1).

Note that a case is assumed in which a reader having only a reading function, not the reader/writer which can read and write information from and to the RFID tag, is used for the game described above. However, in the following description, for convenience, the reader/writer and the reader are collectively referred to as a "reader/writer".

CITATION LIST

Patent Document

Patent Document 1: Japanese Patent Application Laid-Open No. 2016-177814
Patent Document 2: Japanese Patent Application Laid-Open No. 2016-66153

SUMMARY OF THE INVENTION

Problems to be Solved by the Invention

An object of the technology disclosed in the present specification is to provide an information processing apparatus using proximity wireless communication and a control method of the information processing apparatus.

Solutions to Problems

The technology disclosed in the present specification has been made so solve the above problems, and a first aspect of the technology is an information processing apparatus including a detection unit including a plurality of capacitance sensors arranged in a two-dimensional array along an operation surface and a recognition unit that recognizes an object placed on the operation surface on the basis of distribution of detection values of the respective capacitance sensors.

The recognition unit can recognize a first position of an object on the basis of distribution of detection values of the respective capacitance sensors of which a detection value less than a predetermined threshold is discarded. Specifically, the recognition unit recognizes a position of a matrix of which a total of the detection values of the capacitance sensors is maximum or exceeds a predetermined threshold among matrixes of capacitance sensors having an area about the same as an area of a metal portion included in an object as the first position of the object.

Furthermore, the recognition unit can further recognize a first direction of the object at the first position on the basis of the distribution of the detection values of the respective capacitance sensors of which the detection value less than the predetermined threshold is discarded. Specifically, the recognition unit recognizes whether the object is placed vertically or horizontally as the first direction on the basis of a result of comparison between a total value of detection values for each row in the matrix of the capacitance sensors which is recognized that the object is placed at the first position and a detection value for each column.

Furthermore, the recognition unit can recognize a second position including a deviation in the interval between the capacitance sensors from the first position of the object on the basis of the distribution of the detection values of all the capacitance sensors of which the detection value less than the predetermined threshold is not discarded. Specifically, the recognition unit extracts a plurality of capacitance sensors to be feature points from among a plurality of capacitance sensor groups on which the object is placed at the first position, calculates a total value of the detection values of the capacitance sensors for each region including each feature point, and recognizes the second position of the object on the basis of a result of comparing the total values of the respective regions.

Furthermore, the recognition unit can further recognize a second direction of the object at the second position on the basis of the distribution of the detection values of all the capacitance sensors of which the detection value less than the predetermined threshold is not discarded. Specifically, the recognition unit extracts a plurality of capacitance sensors to be feature points from among a plurality of capacitance sensor groups on which the object is placed at the first position, calculates a total value of the detection values of the capacitance sensors for each region including each feature point, and recognizes the second direction of the object on the basis of a result of dividing the regions including the respective feature points into a left and right portions and comparing a difference between the total values in the left regions and a difference between the total values in the right regions.

Furthermore, a second aspect of the technology disclosed in the present specification is a control method of an information processing apparatus including a detection unit including a plurality of capacitance sensors arranged in a two-dimensional array along an operation surface, the method including a recognition step for recognizing an object placed on the operation surface on the basis of distribution of detection values of the respective capacitance sensors.

Effects of the Invention

According to the technology disclosed in the present specification, an information processing apparatus capable of preferably recognizing a position and a direction of a card using proximity wireless communication and a control method of the information processing apparatus can be provided.

Note that the effects described in the present specification are only exemplary, and the effect of the present invention is not limited to those. Furthermore, there is a case where the present invention has an additional effect other than the effects described above.

Other purpose, characteristics, and advantages of the technology disclosed in the present specification would be obvious by the detailed description on the basis of the embodiment described later and the attached drawings.

MODE FOR CARRYING OUT THE INVENTION

Hereinafter, an embodiment of the technology disclosed in the present specification will be described in detail with reference to the drawings.

A. Game Integrated with Objects

An attempt for integrating a digital game executed on an information terminal and a play by using objects has been made by making digital information which is originally virtual information such as characters, weapons, spoils, and the like used in the digital game be used as existing tangible objects such as cards and figures.

For example, a RFID tag is built in or embedded in a real object such as a card and a figure, and a reader/writer is externally and wiredly or wirelessly connected to an information terminal such as a smartphone and a tablet (or game machine). A user who is a player of the game places the card, the figure, and the like on the reader/writer at an appropriate timing during the game. Then, the information terminal reads information from the RFID tag in the card or the figure via the reader/writer or rewrites the information in the RFID tag according to the progress in the game being executed (growth of characters, exhaustion of weapons, acquisition of spoils, and the like).

The following description will be made as assuming a game mainly using cards, for the sake of convenience. It is assumed that a picture representing a corresponding character, weapon, spoil, and the like be drawn on a surface of the card by ticket face printing and the like. Furthermore, assuming an application which uses a single card as reversing the card, pictures may be drawn on both sides. Note that, although it is assumed that the card include paper, the card may include resin or be laminated.

B. System Configuration

Figure 1:
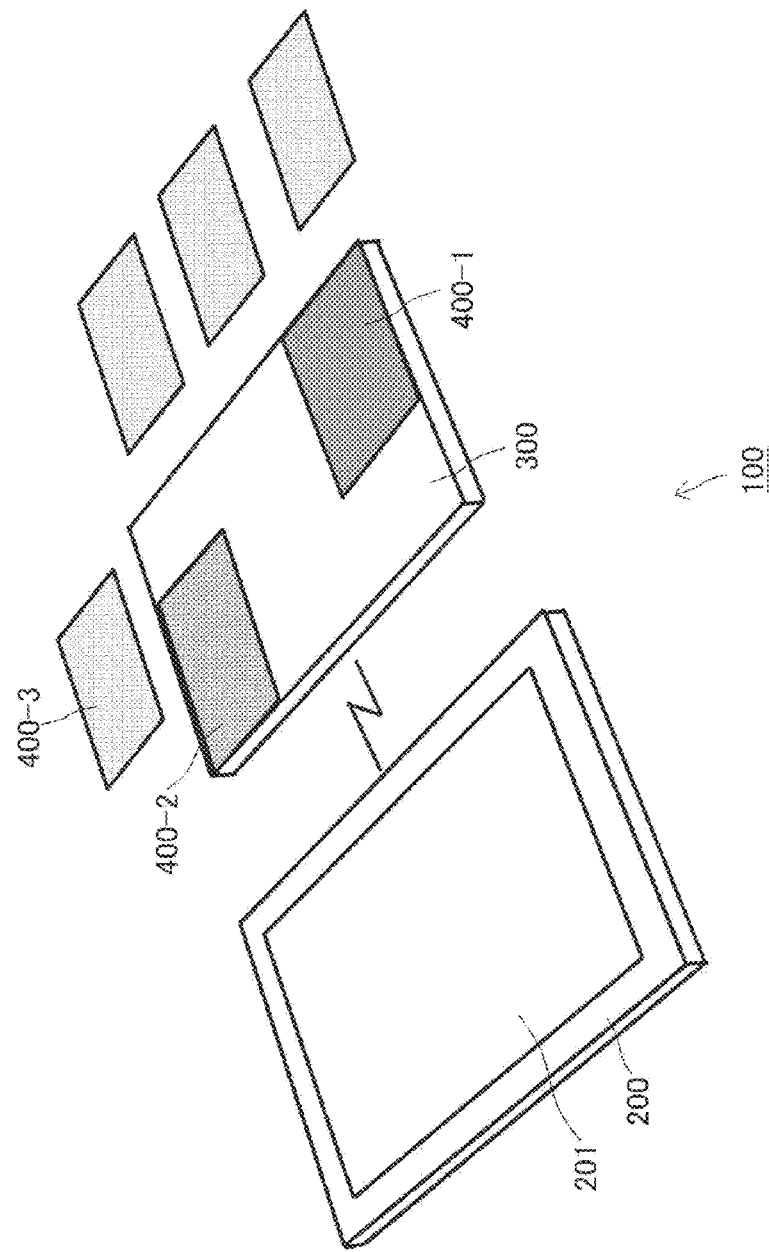
FIG. 1 is a diagram illustrating an exemplary appearance configuration of an information processing system 100 which can execute an application such as a game by using a proximity wireless communication technology.
Figure 2:
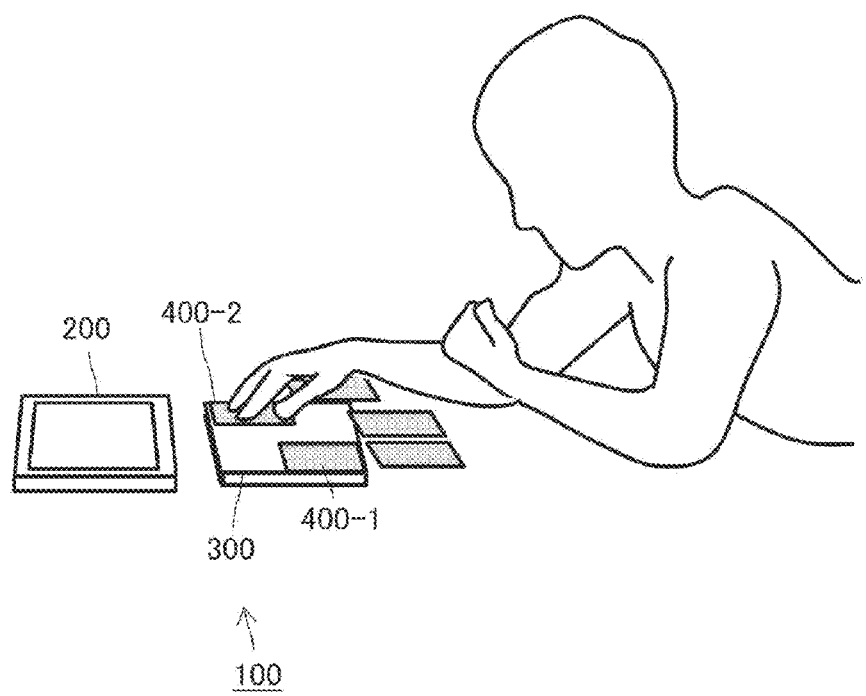
FIG. 2 is a diagram illustrating an example of a state where a single user plays a game by using the information processing system 100.

In FIG. 1, an exemplary appearance configuration of an information processing system 100 is illustrated which can execute an application such as a game by using a proximity wireless communication technology. Furthermore, in FIG. 2, an example of a state where a single user plays a game by using the information processing system 100 is illustrated.

The illustrated information processing system 100 includes a game machine 200 and a pad 300. The game machine 200 includes a general-purpose information terminal, for example, a smartphone, a tablet, and the like and executes a game application. A top surface of the game machine 200 is a screen 201 which displays a video of a game. The screen 201 may be a touch panel type display, and a user who is a player of the game can directly perform an input operation with one's fingertip on the screen 201.

On the other hand, the pad 300 is a plate-like device on which the user who is the player of the game performs an operation such as to place cards 400-1, 400-2, . . . corresponding to the character, the weapon, and the spoil. As described later, in the pad 300, antenna coils used to communicate with the RFID tags embedded in the respective cards 400-1, 400-2, . . . are arranged in a two-dimensional array.

The pad 300 can be used as an external device of the information terminal. The game machine 200 and the pad 300 are connected to each other via wireless communication such as Bluetooth (registered trademark). Naturally, a form may be considered in which the game machine 200 and the pad 300 are wiredly connected to each other by using a cable such as a Universal Serial Bus (USB). Furthermore, it is assumed that the game machine 200 be connected to a wide area network such as the Internet via Wireless Fidelity (Wi-Fi) and the Ethernet (registered trademark) cable.

Figure 3:
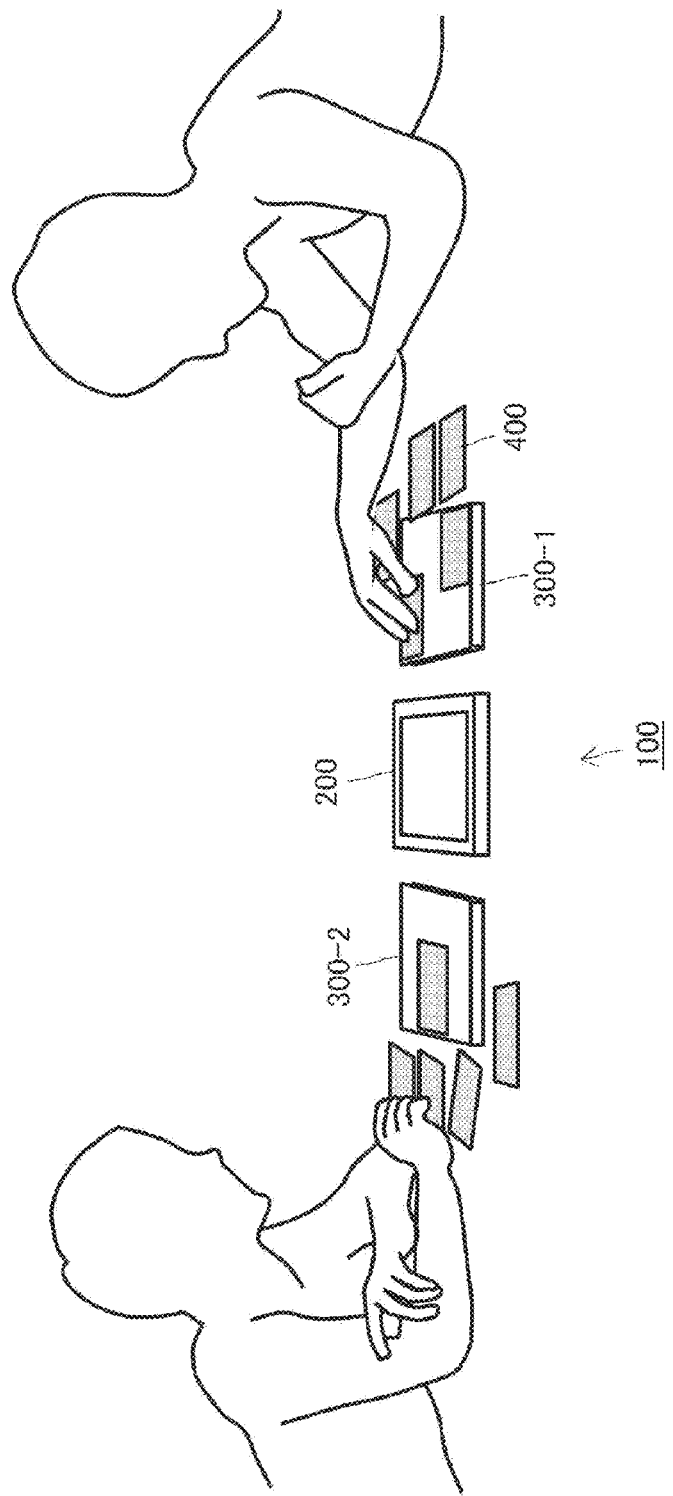
FIG. 3 is a diagram illustrating an example of a state where two users play a game by using the information processing system 100.
Figure 4:
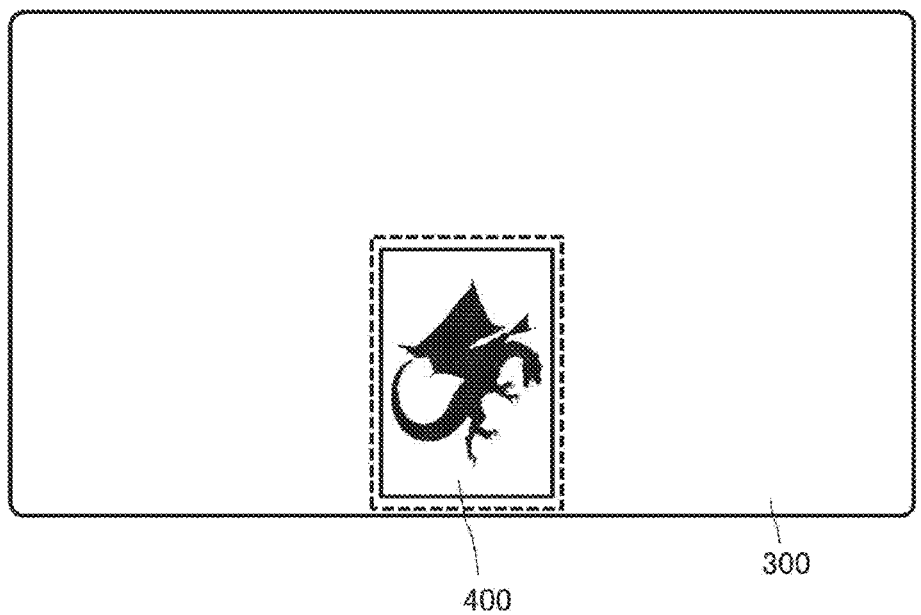
FIG. 4 is a diagram illustrating an exemplary operation of a card 400 on a pad 300 (place card 400 on pad 300).
Figure 5:
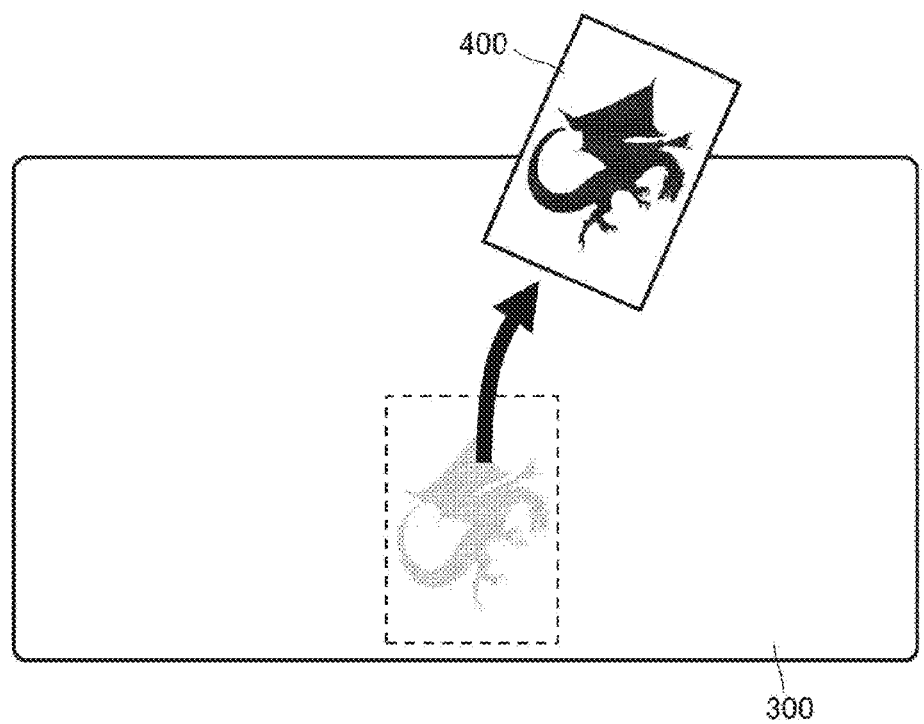
FIG. 5 is a diagram illustrating an exemplary operation of the card 400 on the pad 300 (remove card 400 from pad 300).
Figure 6:
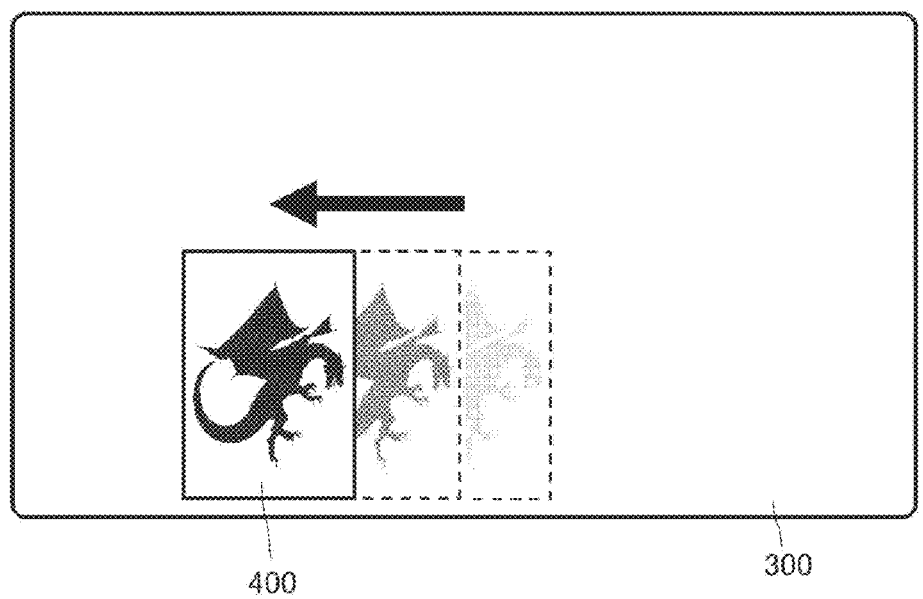
FIG. 6 is a diagram illustrating an exemplary operation of the card 400 on the pad 300 (change position of card 400 on pad 300).
Figure 7:
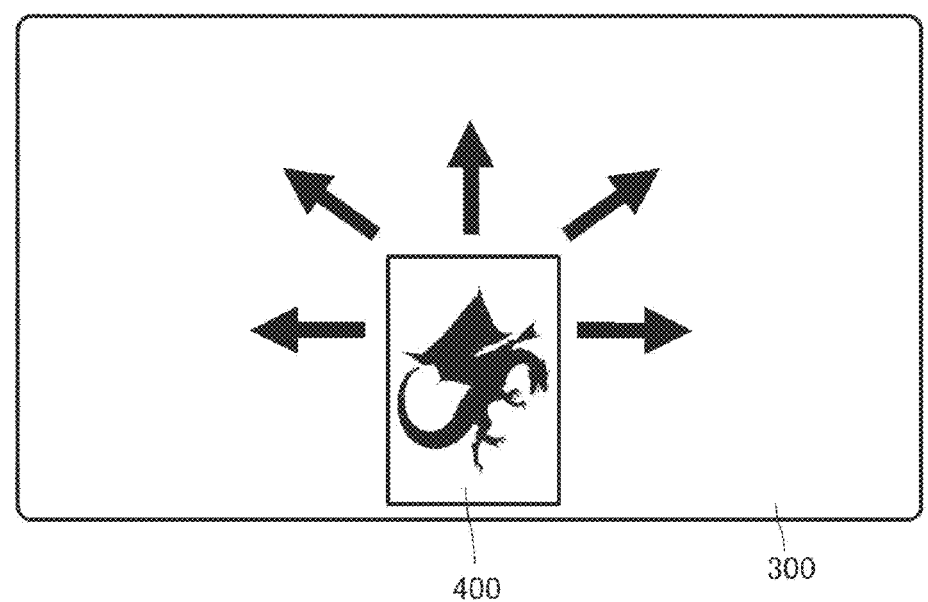
FIG. 7 is a diagram illustrating an exemplary operation of the card 400 on the pad 300 (move card 400 on pad 300 to upper side, lower side, left side, right side, or in oblique direction).
Figure 8:
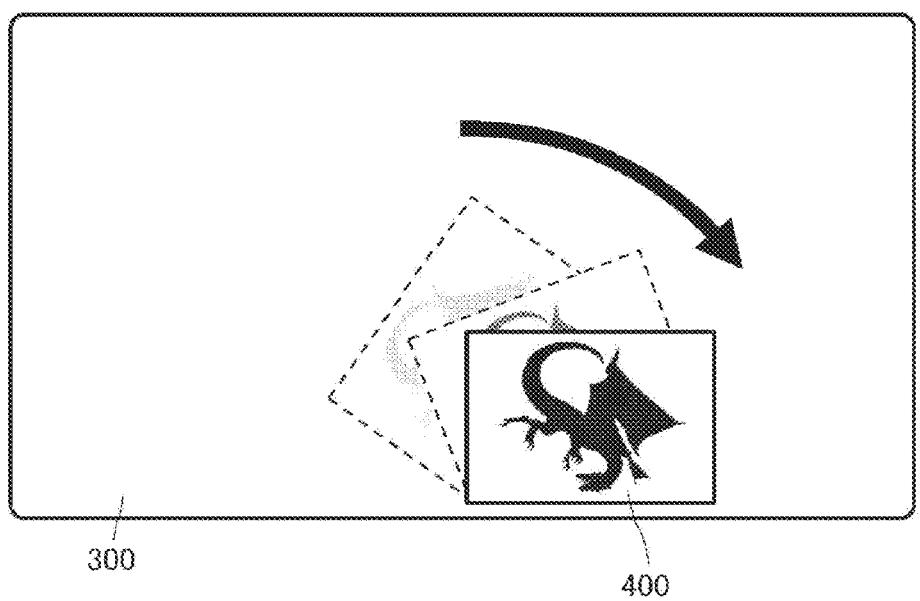
FIG. 8 is a diagram illustrating an exemplary operation of the card 400 on the pad 300 (turn card 400 on its side on pad 300).

A modification of the information processing system 100 is illustrated in FIG. 3. In the example illustrated in FIG. 1, the single user enjoys the game executed by the game machine 200 while operating the cards on the pad 300. On the other hand, in the example illustrated in FIG. 2, two users participate in the game executed by the game machine 200 while operating cards as using pads 300-1 and 300-2 dedicated to each user. In other words, FIG. 3 illustrates a usage form in which the pad 300 is added for each participant of the game. Each of the pads 300-1 and 300-2 is connected to the game machine 200 via the wireless communication such as the Bluetooth (registered trademark) (the same applies as above).

Note that, although not illustrated, the pad 300 to be connected to the game machine 200 may be added according to the number of players who participate in the game. Alternatively, a usage form is also assumed in which the plurality of players plays the game as sharing the single pad 300 without adding the pad 300 regardless of the number of players who participate in the game.

Exemplary operations of the card 400 on the pad 300 are illustrated in FIGS. 4 to 8. The user who is the player of the game can perform an operation of the card 400, for example, to place the card 400 on the pad 300 (refer to FIG. 4), to remove the card 400 from the pad 300 (refer to FIG. 5), to change a position of the card 400 on the pad 300 (refer to FIG. 6), to move the card 400 on the pad 300 to the upper side, lower side, left side, right side, or in an oblique direction (refer to FIG. 7), to change a direction of the card 400 on the pad 300 from a vertical direction to a horizontal direction (or rotate) (refer to FIG. 8), and to reverse the card 400 on the pad 300 (not illustrated).

Figure 9:
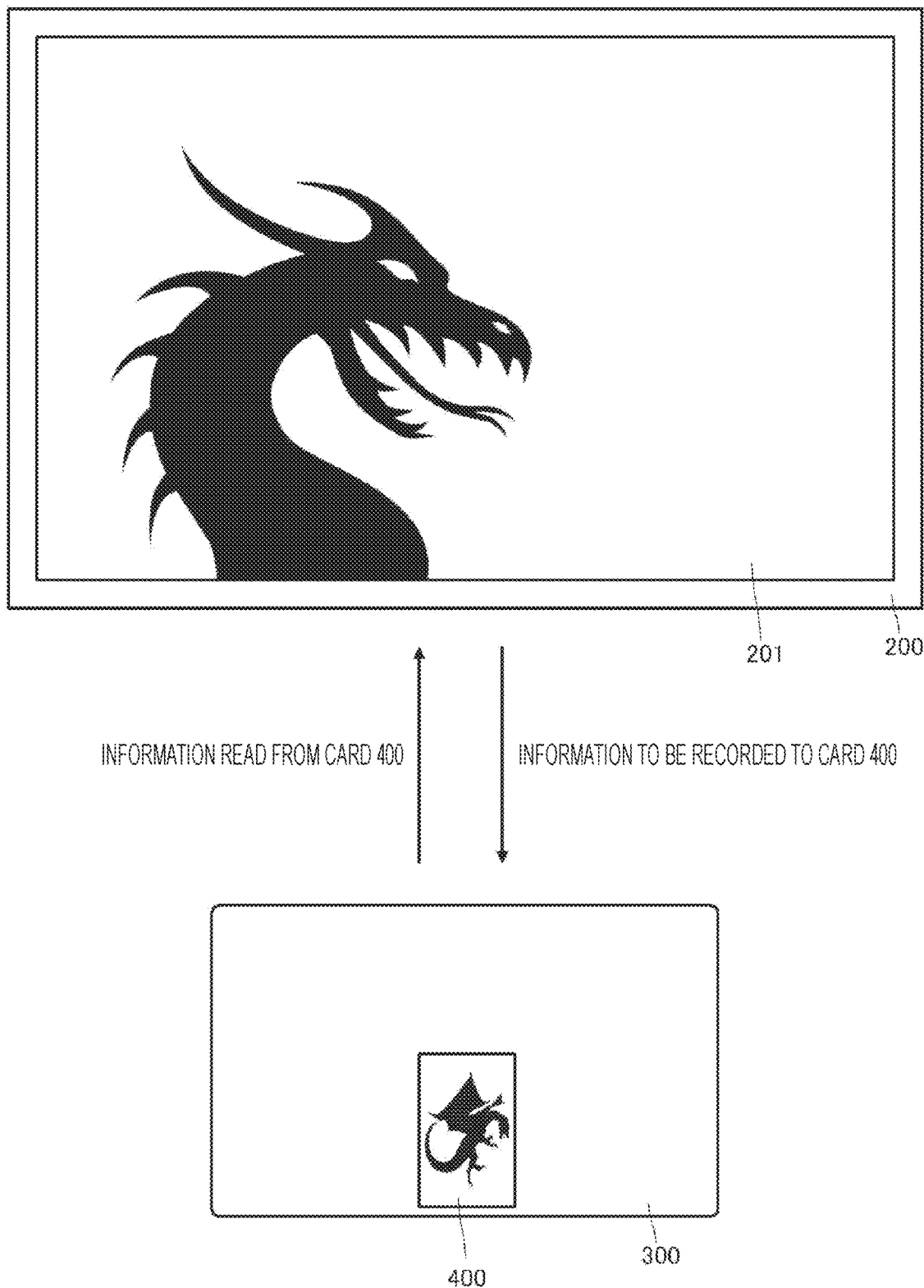
FIG. 9 is a diagram illustrating an example of an interaction corresponding to the card 400 on a side of a game machine 200.

On the side of the game machine 200, it is possible to control a video on the screen 201 and a sound output and realize an interaction by the video and the sound of the game corresponding to the card 400 on the basis of information read from the RFID tag in the card 400 placed on the pad 300. For example, on the side of the game machine 200, a video of a character corresponding to the picture drawn on the surface of the card 400 is made to appear in the screen 201 (refer to FIG. 9).

Furthermore, the game machine 200 can realize an interaction by a video and sound of the game in response to the user's operation on the card 400 on the pad 300 such as to remove the card 400 from the pad 300, to change the position of the card 400, to move the card 400 to the upper side, the lower side, the left side, the right side, or in the oblique direction, to turn the card 400 on its side, and to reverse the card 400 (refer to FIGS. 4 to 8). For example, the game machine 200 controls the outputs of the video and the sound, for example, to switch the screen or the progress of the game in response to the type of the card 400 placed on the pad 300 by the user, the position and the direction of the card 400 placed on the pad 300, and the movement of the card 400 on the pad 300.

Furthermore, the game machine 200 can record information such as a state of the character (degree of growth, feeling, fatigue level, and the like), a game score, and the like to the RFID tag in the card 400 via the pad 300 in accordance with the progress in the game.

Figure 10:
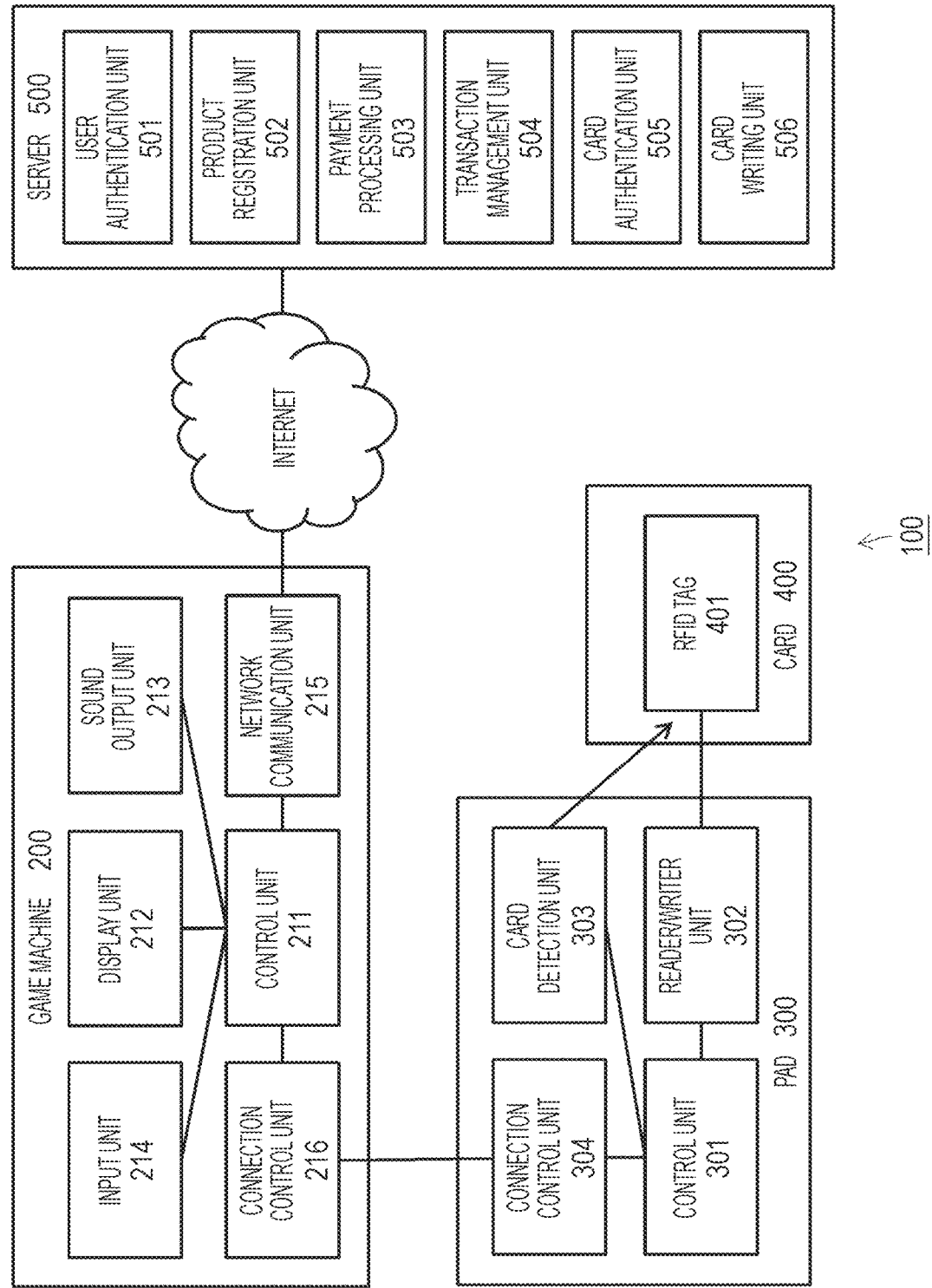
FIG. 10 is a diagram schematically illustrating a functional configuration of the information processing system 100.

FIG. 10 schematically illustrates a functional configuration of the information processing system 100. The information processing system 100 illustrated in FIG. 10 further includes a server 500 in addition to the game machine 200, the pad 300, and the card 400 illustrated in FIG. 1. The server 500 is provided, for example, on the wide area network such as the Internet. The game machine 200 is connected to an external network via the Wi-Fi or the Ethernet (registered trademark) cable and can communicate with the server 500.

A functional configuration of each device included in the information processing system 100 will be described below in detail.

The game machine 200 is configured as, for example, an information terminal such as a smartphone and a tablet and includes a control unit 211, a display unit 212, a sound output unit 213, an input unit 214, a network connection unit 215, and a connection control unit 216.

The control unit 211 executes the game application and integrally controls an operation of each unit in the game machine 200. The game application can be downloaded, for example, from a predetermined site on the Internet via the network connection unit 215. Alternatively, a configuration can be used in which a slot (not illustrated) to which a cartridge for the game application is attached is provided in the game machine 200 and the game application read from the cartridge attached to the slot is executed by the control unit 211.

The display unit 212 includes the screen 201 (described above) and displays and outputs a processing result by the control unit 211 such as a video of the game. Furthermore, the sound output unit 213 outputs the processing result by the control unit 211 such as the sound and the video of the game as sounds. Furthermore, although not illustrated, the game machine 200 may further include an output device using haptics.

The input unit 214 includes, for example, a touch panel superimposed on the surface of the screen 201, and the user who is the player of the game can perform an operation for inputting a command of the game and the like via the touch panel. Furthermore, the input unit 214 can be configured to include a speaker and the like and receive a sound command from the user. The game machine 200 may further include a joystick or a controller for the game as the input unit 214.

The network connection unit 215 conforms to a wireless or wired Local Area Network (LAN) standard such as the Wi-Fi and the Ethernet (registered trademark) and can be connected to the LAN installed in a place where the game machine 200 is provided (in home and the like) and can be further connected to the wide area network such as the Internet via the LAN.

The connection control unit 216 is connected to the pad 300 by using wireless communication such as the Bluetooth (registered trademark) or a cable such as a USB and exchanges information with the pad 300. For example, the connection control 216 receives the information read from the card 400 placed on the pad 300 from the pad 300 and transmits information to be recorded to the card 400 to the pad 300.

The pad 300 includes a control unit 301, a reader/writer unit 302, a card detection unit 303, and a connection control unit 304.

As understood from FIG. 1, the pad 300 has a plate-like housing structure, and the housing is placed on a floor or a desk in a state an operation surface on which the user performs an operation such as placing the card 400 or moving the card 400 faces upward and is used.

The reader/writer unit 302 includes a plurality of antenna coils (not illustrated in FIG. 10) arranged in a two-dimensional array in an in-plane direction and can read information from the RFID tag in the card 400 placed on anywhere on the operation surface and write information to the RFID tag by selectively using any one of the antenna coils.

The card detection unit 303 detects the position and the direction of the card 400 placed on the operation surface. A configuration of the card detection unit 303 and details of processing for detecting the position and the direction of the placed card 400 will be described later.

The connection control unit 304 is connected to the game machine 200 by using wireless communication such as the Bluetooth (registered trademark) or a cable such as a USB and exchanges information with the game machine 200. For example, the connection control unit 304 transmits information read from the card 400 placed on the pad 300 by the reader/writer unit 302 to the game machine 200 and receives the information to be recorded to the card 400 from the game machine 200 and outputs the received information to the reader/writer unit 302.

The control unit 301 integrally controls an operation of each unit in the pad 300. The control unit 301 controls transmission and reception processing of information with the game machine 200 via the connection control unit 304. Furthermore, the control unit 301 controls information reading and writing operations from and to the RFID tag in the card 400 via the reader/writer unit 302.

Furthermore, the control unit 301 performs control for switching the antenna coils used to access the card 400 placed on the operation surface on the basis of the detection result of the card detection unit 303.

Moreover, the control unit 301 can detect the user's operation on the card 400 on the operation surface such as to remove the card 400 from the pad 300, to change the position of the card 400, to move the card 400 to the upper side, the lower side, the left side, the right side, and in the oblique direction, to turn the card 400 on its side, and to reverse the card 400 on the basis of the detection result of the card detection unit 303 and notifies the detection result of the user's operation of the game machine 200 via the connection control unit 304.

The card 400 is a so-called "IC card" in which the RFID tag 401 is embedded in a non-metallic sheet such as paper or resin. The RFID tag 401 includes a communication function module which can perform proximity wireless communication on the basis of a predetermined standard with the reader/writer unit 302 of the pad 300 and a storage function (memory) module from and to which information can be read or written by the reader/writer unit 302 by using the proximity wireless communication. Although not illustrated in FIG. 10, the antenna coil for proximity wireless communication (not illustrated in FIG. 10) is formed in the card 400 by using technology such as printing and etching. Furthermore, on one surface or both surfaces of the card 400, the pictures representing the character, the weapon, the spoil, and the like of the game are drawn by ticket surface printing and the like.

The server 500 manages information regarding the user who is the player of the game and the card 400 distributed to each user. The server 500 may physically include a single server device or may include a plurality of server devices. For example, the server 500 is operated by a publisher (or business operator entrusted by publisher) of the game application executed by the game machine 200, the card 400, and the like. The server 500 is provided, for example, on the wide area network such as the Internet. The game machine 200 is connected to an external network via the Wi-Fi or the Ethernet (registered trademark) cable and can communicate with the server 500.

In the example illustrated in FIG. 10, the server 500 includes a user authentication unit 501, a product registration unit 502, a payment processing unit 503, a transaction management unit 504, a card authentication unit 505, a card writing unit 506, and the like.

The user authentication unit 501 executes authentication processing of the user who is the user of the game machine 200 and the player of the game. For the authentication processing, authentication information read from the card 400 placed on the pad 300 by the user may be used.

The product registration unit 502 registers products to be sold to the user, such as the game application to be downloaded to the game machine 200 and the card 400 to be used by the game application, and manages the products after being sold.

The payment processing unit 503 executes payment processing such as payment for the sales of the product such as downloading of the game application, the distribution of the card 400, and the like with respect to the user who is the player of the game.

The transaction management unit 504 performs central control on information regarding transactions made with respect to the user, such as downloading the game application to the game machine 200 and the distribution of the card 400 to be used for the downloaded game application.

The card authentication unit 505 executes the authentication processing of the card 400 on the basis of, for example, the information read from the card 400 placed on the pad 300. The authentication processing of the card 400 includes, for example, verification of authenticity of the card 400 to be used and authenticity of the user who uses the card 400.

The card writing unit 506 executes information writing processing to the card 400 placed on the pad 300 via the game machine 200 and the pad 300. The writing processing to the card 400 includes normal data writing processing, activation processing of the card 400 in an initial state (at the time of shipment), and initialization and invalidation processing of the activated card 400.

Figure 11:
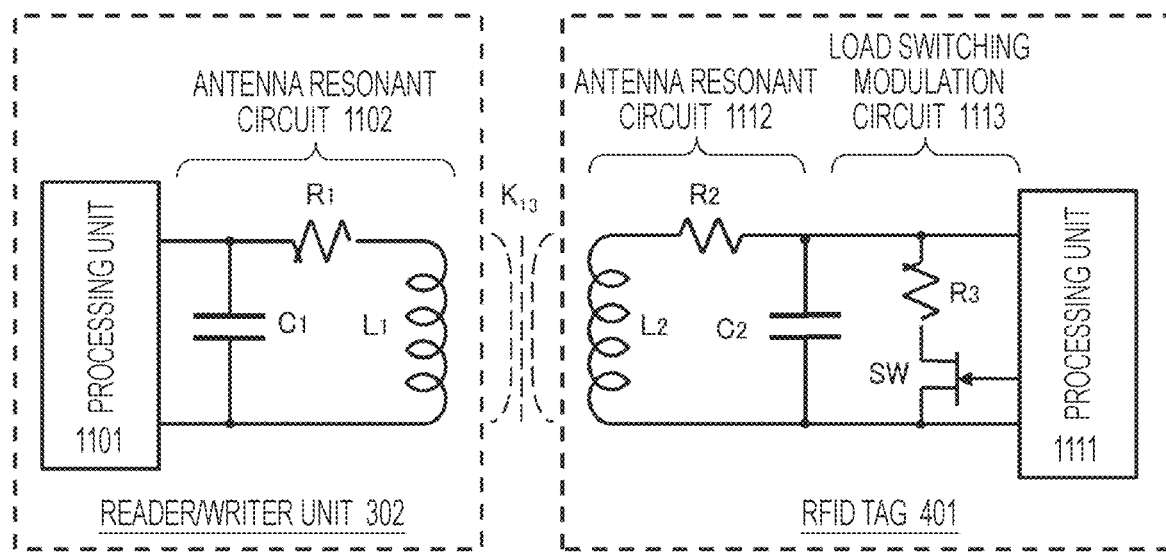
FIG. 11 is a diagram illustrating a functional configuration for performing proximity wireless communication between a reader/writer unit 302 in the pad 300 and a RFID tag 401 in the card 400.

Between the reader/writer unit 302 in the pad 300 and the RFID tag 401 in the card 400, for example, short-distance wireless communication is performed according to a proximity wireless communication standard such as the Near Field Communication (NFC) developed by Sony Corporation and Royal Philips. In FIG. 11, a functional configuration for performing the proximity wireless communication between the reader/writer unit 302 in the pad 300 and the RFID tag 401 in the card 400 is visually illustrated. Antenna resonant circuits 1102 and 1112 respectively provided in the reader/writer unit 302 and the card 400 are electromagnetically coupled to each other so as to exchange information signals. Specifically, the RFID tag 401 modifies unmodulated carrier wave sent from the reader/writer unit 302 and sends the modulated carrier wave back, and the reader/writer unit 302 can demodulate the modulated carrier wave and read the information recorded in the RFID tag 401.

The antenna resonant circuit 1102 of the reader/writer unit 302 includes a resistor $R_1$, a capacitor $C_1$, and a coil $L_1$ and transmits an information signal generated by a processing unit 1101 to the side of the RFID tag 401. Furthermore, the antenna resonant circuit 12 receives the information signal from the RFID tag 401 and supplies the information signal to the processing unit 1101. Note that a resonant frequency specific for the antenna resonant circuit 1102 is set to a predetermined value in advance according to a capacitance of the capacitor $C_1$ and an inductance of the coil $L_1$.

On the other hand, the antenna resonant circuit 1112 of the RFID tag 401 includes a resistor $R_2$, a capacitor $C_2$, and a coil $L_2$ and transmits an information signal which is generated by a processing unit 1111 and modulated by a load switching modulation circuit unit 1113 to an antenna (coil $L_2$) on the side of the reader/writer unit 302. Furthermore, the antenna resonant circuit 1112 receives the information signal from the side of the reader/writer unit 302 and supplies the received signal to the processing unit 1111. Note that a resonant frequency of the antenna resonant circuit 1112 is set to a predetermined value in advance according to a capacitance of the capacitor $C_2$ and an inductance of the coil $L_2$.

The processing unit 1111 on the side of the RFID tag 401 includes a memory (not illustrated) for storing a data sequence and the like. The processing unit 1101 on the side of the reader/writer unit 302 accesses, for example, reading and writing data to, the memory in the processing unit 1111 through the proximity wireless communication. Between the reader/writer unit 302 and the RFID tag 401, a data transmission operation can be performed after a predetermined authentication processing procedure defined by the NFC is executed.

Note that, in the proximity wireless communication such as the NFC, a communication function and information are protected in a circuit chip having tamper resistance, and it is difficult to intercept the communication since the communication can be performed in a short distance. Therefore, it is possible to suitably prevent unauthorized access and falsification of data and achieve secure communication. The proximity wireless communication technology has already been widely used for, for example, payment at a store, an automatic ticket gate in a station, entry and exit management and locking of a building, and authentication technology.

C. Detection of Position and Direction of Card

As described above, it is possible for the user to perform the operations on the card 400 on the pad 300 (refer to FIGS. 4 to 8) such as to remove the card 400 from the pad 300, to change the position of the card 400, to move the card 400 to the upper side, the lower side, the left side, the right side, or in the oblique direction, to turn the card 400 on its side, and to reverse the card 400. Furthermore, the game machine 200 can use the operation of the card 400 on the pad 300, for example, an interaction for switching the screen and the progress of the game in response to the position and the direction of the card 400 placed on the pad 300 by the user and the movement of the card 400 on the pad 300 for various applications.

As a premise of realizing the application using the operation of the card 400 on the pad 300, it is necessary to detect the position or the direction (or inclination) of the card 400 placed on the pad 300 in some detail. Furthermore, there is a case where a plurality of cards 400-1, 400-2, . . . is placed on the pad 300 at the same time (refer to FIGS. 1 and 2). In this case, the pad 300 needs to separately detect each card and individually execute reading and writing processing relative to each of the cards 400-1, 400-2 . . . .

A rough position where the card is placed is found according to reception signal intensity distribution of the plurality of antenna coils arranged in a two-dimensional array, and the antenna coil suitable for communicating with the RFID tag in the card can be identified. For example, a system is proposed which identifies a RFID tag in a communication range of the selected antenna coil in a case where the carrier wave transmitted by the RFID tag is selectively received by any one of the plurality of antenna coils (for example, refer to Patent Document 1). However, in this system, since a resolution for recognizing the position of the card depends on the size of the antenna coil and an interval between the antenna coils, it is difficult to detect more detailed position and direction of the card, and it is considered that available applications are limited.

For example, a system is proposed which recognizes that a detection target has contact with the operation surface of the pad by using a sensor module in which touch sensors are arranged in a two-dimensional array and incorporating a conductor in the detection target (card, figure, and the like) which incorporates the RFIF tag (for example, refer to Patent Document 1). Furthermore, an information processing system is proposed which detects a direction of the figure on the basis of positional information of a projection which is detected when the figure is placed on the pad, by using a pad in which a touch panel is superimposed on a surface and forming a plurality of projections on a bottom surface of a base of the figure in which the RFID tag is embedded (for example, refer to Patent Document 2). However, it is considered that the resolution with which the position of the detection target in these systems can be recognized is within about the interval between the sensors. Furthermore, in a system using the projections on the bottom surface of the detection target, in a case where a lightweight paper card, not a heavy object such as a figure, is used, it is concerned that the touch panel does not respond to the projections well, the projection is worn by using the projection a number of times, and the position of the projection cannot be detected in a case where the card is reversed and a surface with no projections has contact with the touch panel.

In the information processing system 100 according to the present embodiment, as illustrated in FIG. 10, the pad 300 includes the card detection unit 303 which detects the position and the direction of the card 400 placed on the operation surface. In the following description, configurations of the card detection unit 303 and the pad 300 capable of suitably detecting the position and the direction of the card 400 placed on the pad 300 and the processing method for suitably detecting the position and the direction of the card 400 by using such card detection unit 303 will be described in detail.

Figure 12:
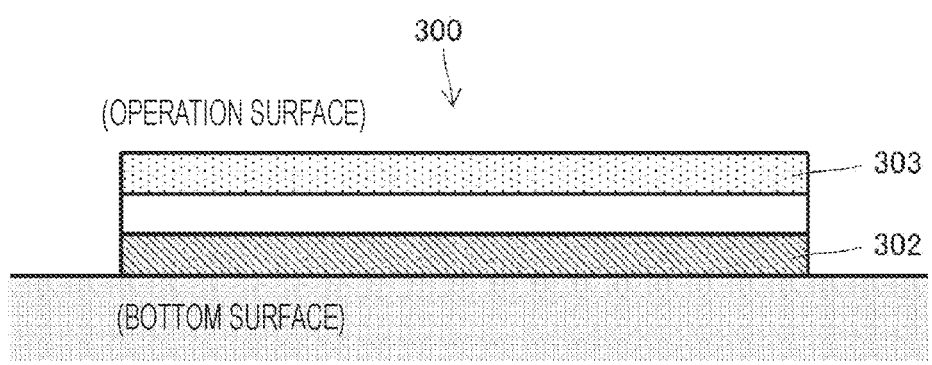
FIG. 12 is a diagram schematically illustrating a cross-sectional structure of the pad 300.

FIG. 12 schematically illustrates a cross-sectional structure of the pad 300. However, in FIG. 12, illustration of a housing and a circuit substrate of the pad 300 is omitted. Basically, the pad 300 is used as the housing is placed on a floor or a desk in a state the operation surface on which the user performs an operation such as placing the card 400 or moving the card 400 faces upward and is used. The card detection unit 303 is arranged on the side of the operation surface. Furthermore, although the reader/writer unit 302 includes a plurality of antenna coils arranged in a two-dimensional array in an in-plane direction, the reader/writer unit 302 is arranged on a side of the bottom surface opposite to the operation surface.

Note that, in FIG. 12, the pad 300 has a configuration in which the card detection unit 303 and the reader/writer unit 302 are arranged from the top (in other words, side of operation surface) in order. However, a configuration in which the reader/writer unit 302 and the card detection unit 303 are arranged in this order which is reverse to the above order according to, for example, detection sensitivity necessary for each of the card detection unit 303 and the reader/writer unit 302, and a configuration in which a capacitance sensor is arranged in the antenna coil of the reader/writer unit 302 and a card detection function and a reader/writer function are multiplexed in one layer are considered.

Figure 13:
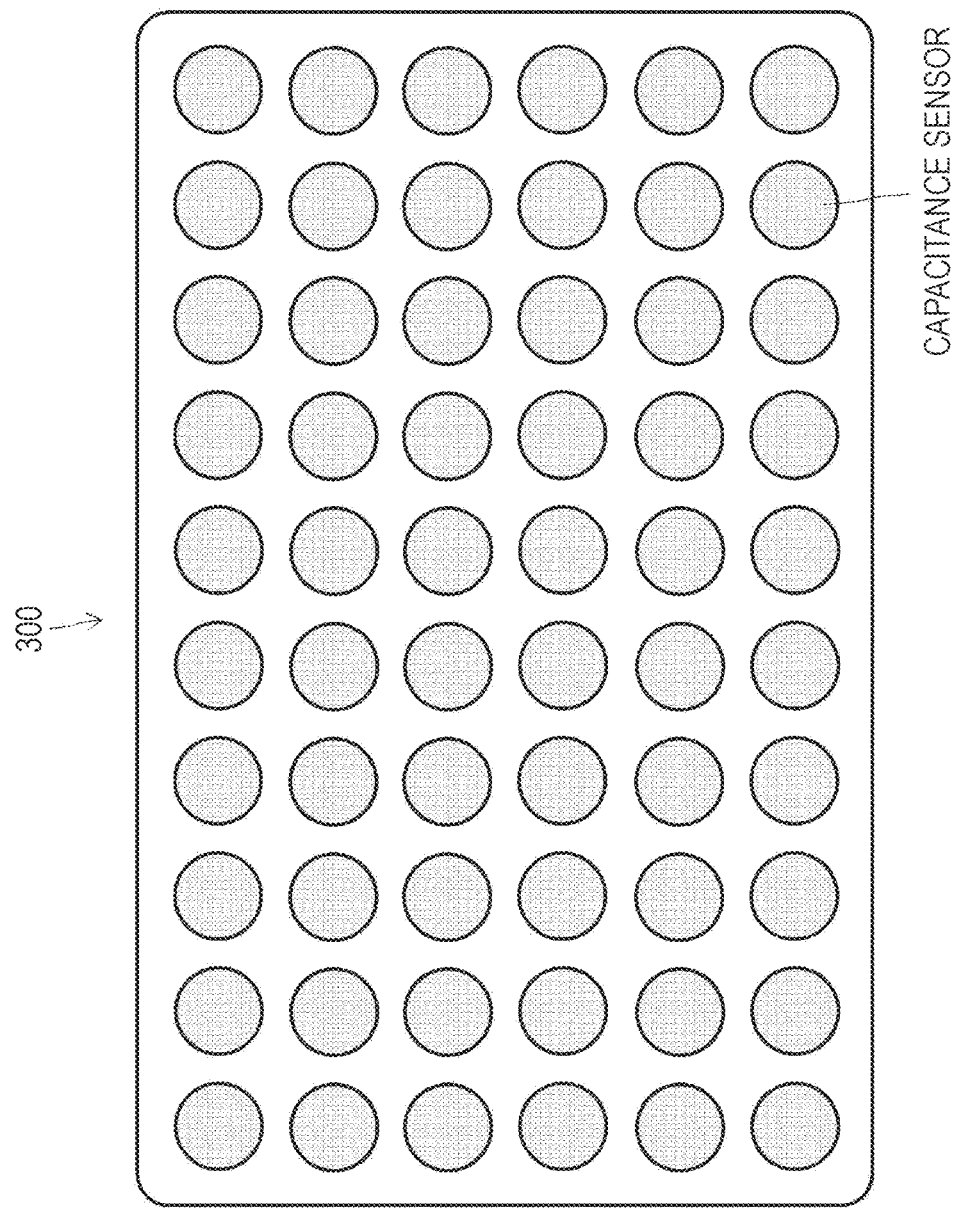
FIG. 13 is a diagram illustrating a state where an inside of a card detection unit 303 is viewed from above.

In FIG. 13, a state where the inside of the card detection unit 303 is viewed from the above (or side of operation surface) is illustrated. In FIG. 13, each of circles filled with gray is a capacitance sensor. As illustrated in FIG. 13, the card detection unit 303 is configured by arranging N×M capacitance sensors in a two-dimensional array in an in-plane direction of the operation surface.

The capacitance sensor is basically a proximity sensor using a phenomenon in which charges Q accumulated in an electrode change according to approach of an object, and as a result, a capacitance C changes. For example, the change in the capacitance C can be measured as an oscillation state of a CR oscillation circuit. The following description will be made as assuming that the card detection unit 303 output detection results of respective capacitance sensors arranged in the N×M matrix as a detection value indicating a detection level by a single byte from zero to 255. When an object is placed on the operation surface of the pad 300, as the capacitance sensor is closer to the object, the capacitance largely changes, and a higher detection value is output. Furthermore, since the capacitance is more largely changed when a metal object approaches the sensor, a higher detection value is output. On the other hand, since the change in the capacitance is small when a non-metallic object such as paper and resin approaches the sensor, a lower detection value is output.

Note that, regarding the arrangement of the N×M capacitance sensors in the card detection unit 303, in the example illustrated in FIG. 13, the arrangement of the sensors is 6×10. For example, if a large number of small capacitance sensors is arranged at short intervals, a resolution for detecting the card 400 is enhanced. However, the number of used sensors is increased, and manufacturing cost of the card detection unit 303 (or pad 300) is increased. Therefore, in consideration of both the detection accuracy and the cost of the card 400 to be required, the arrangement of the minimum number of capacitance sensors to acquire a desired resolution is determined.

Figure 14:
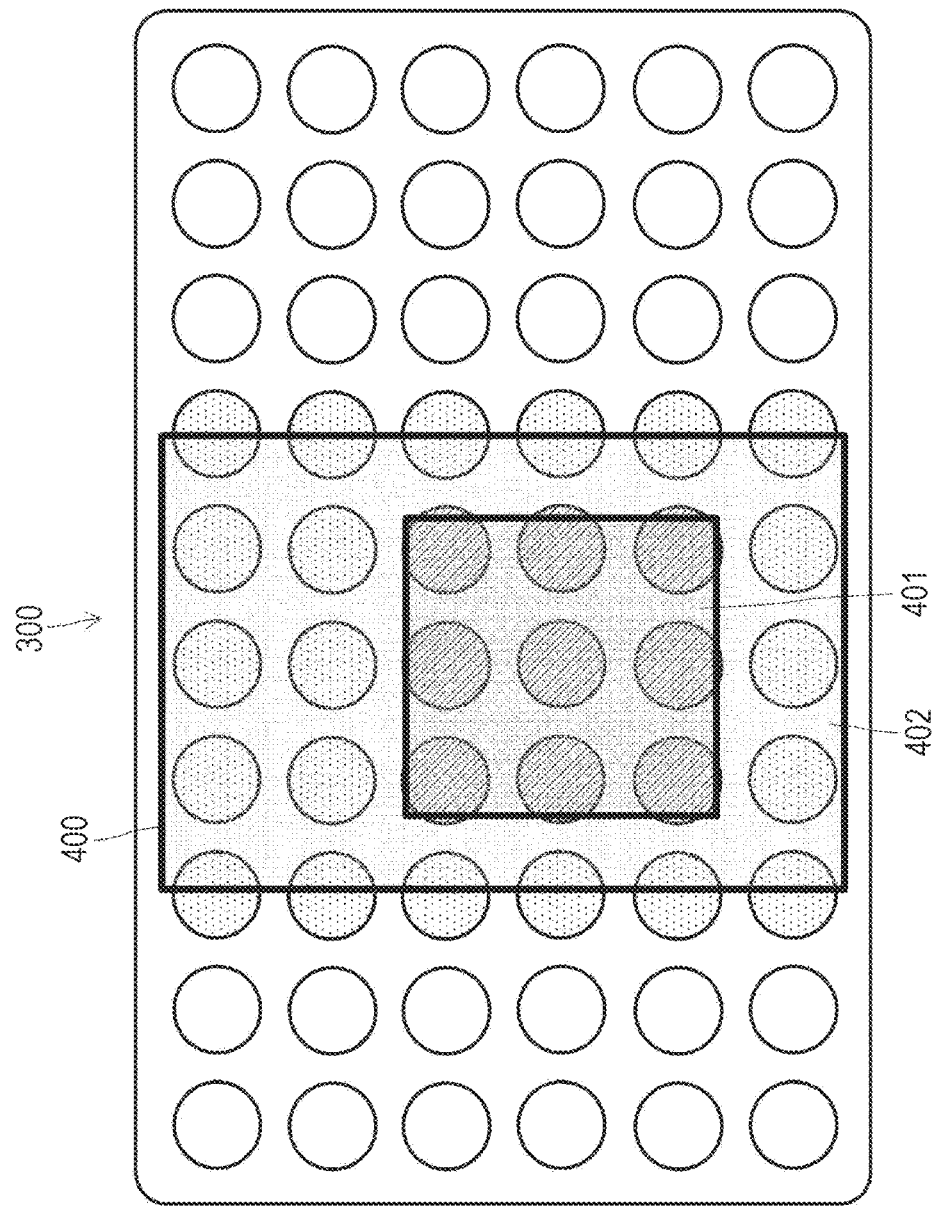
FIG. 14 is a diagram illustrating a state where the card 400 is placed on the card detection unit 303.

In FIG. 14, a state where the card 400 is placed on the card detection unit 303 (operation surface of pad 300) in which the capacitance sensors are arranged in a two-dimensional array is illustrated.

The card 400 includes a portion of the RFID tag 401 including a metal component such as an antenna coil including aluminum and a portion of a non-metallic card main body 402 including paper, resin, and the like. Since a capacitance of the capacitance sensor (in FIG. 14, indicated by hatching) on which the portion of the RFID tag 401 including the metal component is placed largely changes, the capacitance sensor outputs a higher detection value. In the present embodiment, it is assumed that the metal portion of the card 400 such as the RFID tag 401 has an area about the same as that of 3×3 capacitance sensors. However, the present embodiment is not limited to this. On the other hand, since the capacitance of the capacitance sensor (in FIG. 14, indicated by dots) on which the portion of the non-metallic card main body 402 other than the RFID tag 401 is placed slightly changes, the capacitance sensor outputs a lower detection value.

Here, design of the card 400 will be additionally described.

Figure 15:
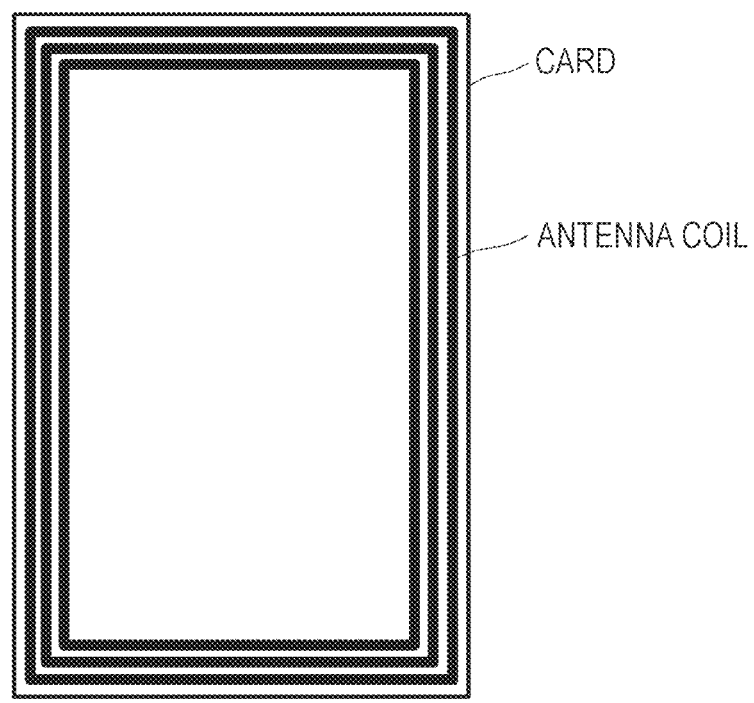
FIG. 15 is a diagram for explaining design of the card 400.
Figure 16:
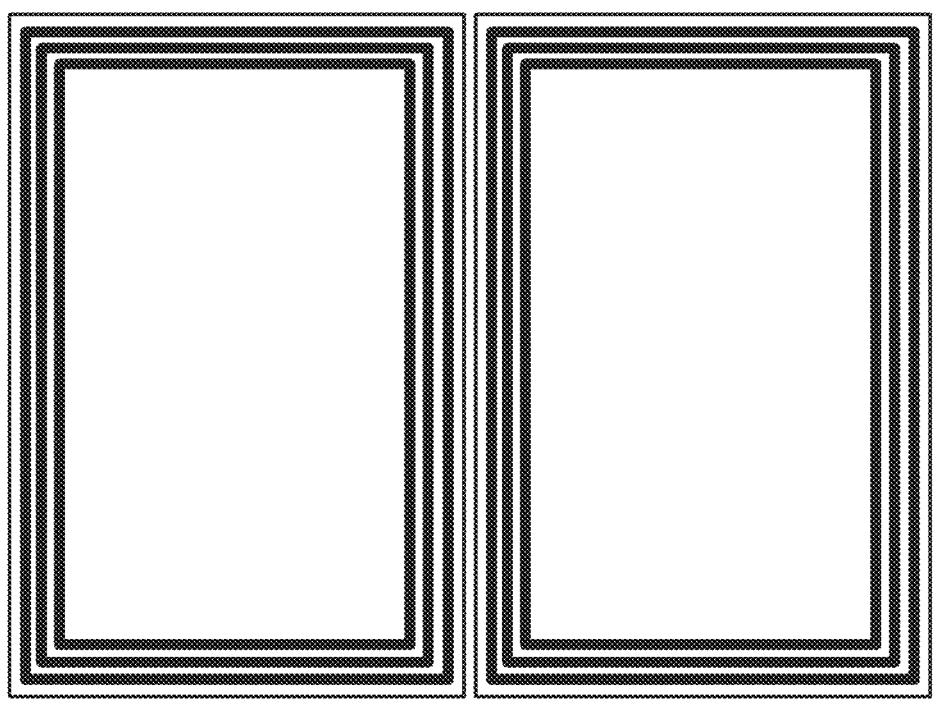
FIG. 16 is a diagram for explaining the design of the card 400.

From the viewpoint of improving performance of the proximity wireless communication with the reader/writer unit 302, it is preferable that the antenna coil of the RFID tag 401 be form as large as possible in the surface area of the card main body 402 as illustrated in FIG. 15. However, as illustrated in FIG. 16, when two cards respectively having antenna coils which are largely formed at a maximum are placed adjacent to each other on the pad 300, there is a possibility that the card detection unit 303 captures an image of combined antenna coils of the two cards and detects the two cards as a single card.

Figure 17:
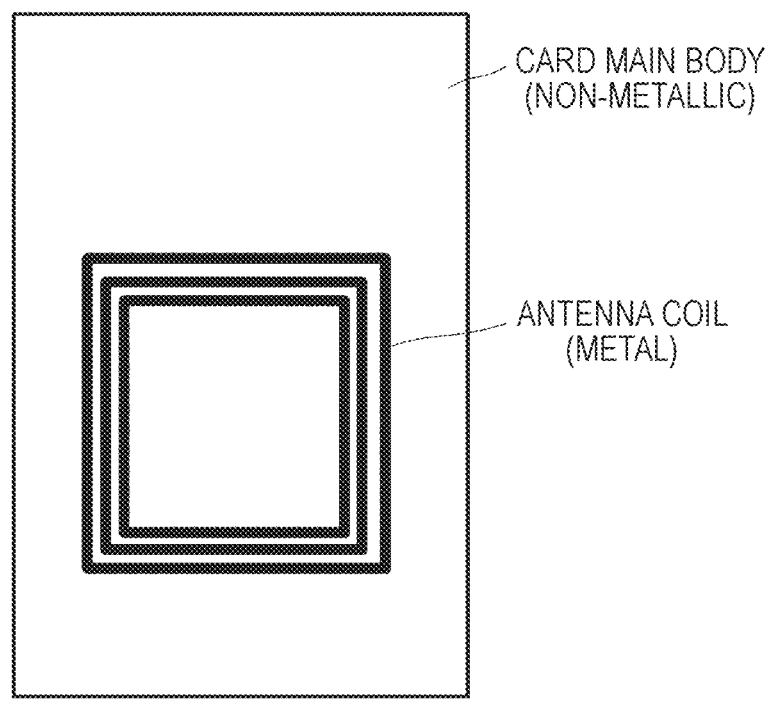
FIG. 17 is a diagram for explaining the design of the card 400.
Figure 18:
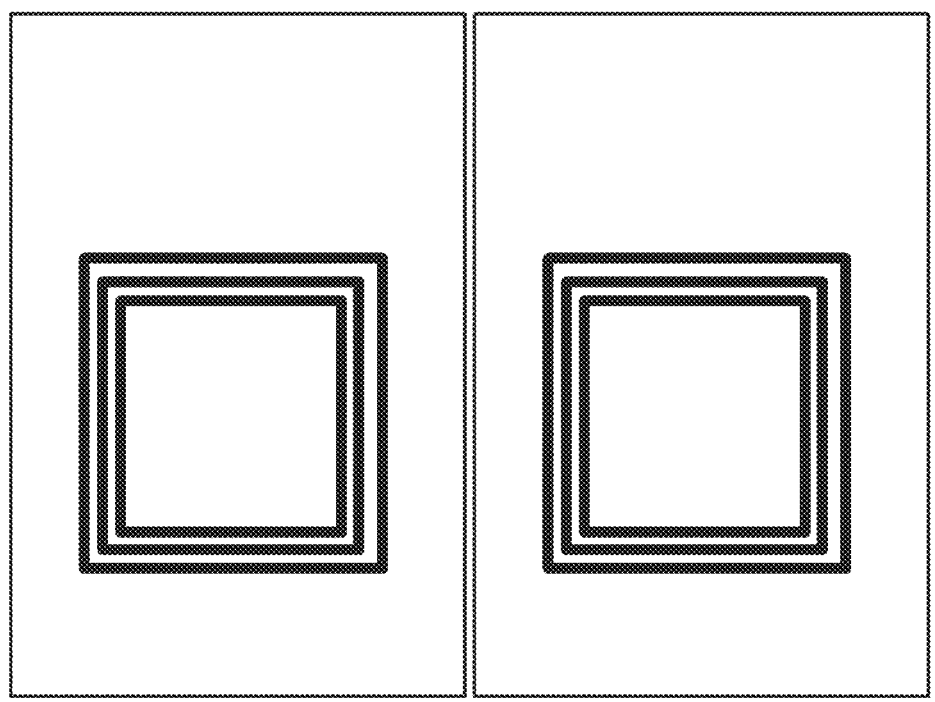
FIG. 18 is a diagram for explaining the design of the card 400.

Therefore, from the viewpoint of card detection, as illustrated in FIG. 17, it is preferable to form the antenna coil of the RFID tag 401 to be smaller than the surface area of the card main body 402. In FIG. 18, a state where the two cards in which the antenna coils are formed to be small are placed adjacent to each other on the pad 300 is illustrated. In this case, even though the card main bodies have contact with each other, the respective antenna coils are apart from each other via non-metallic card main bodies (paper). Therefore, the card detection unit 303 can separately capture the images of the antenna coils of the respective cards.

Figure 19:
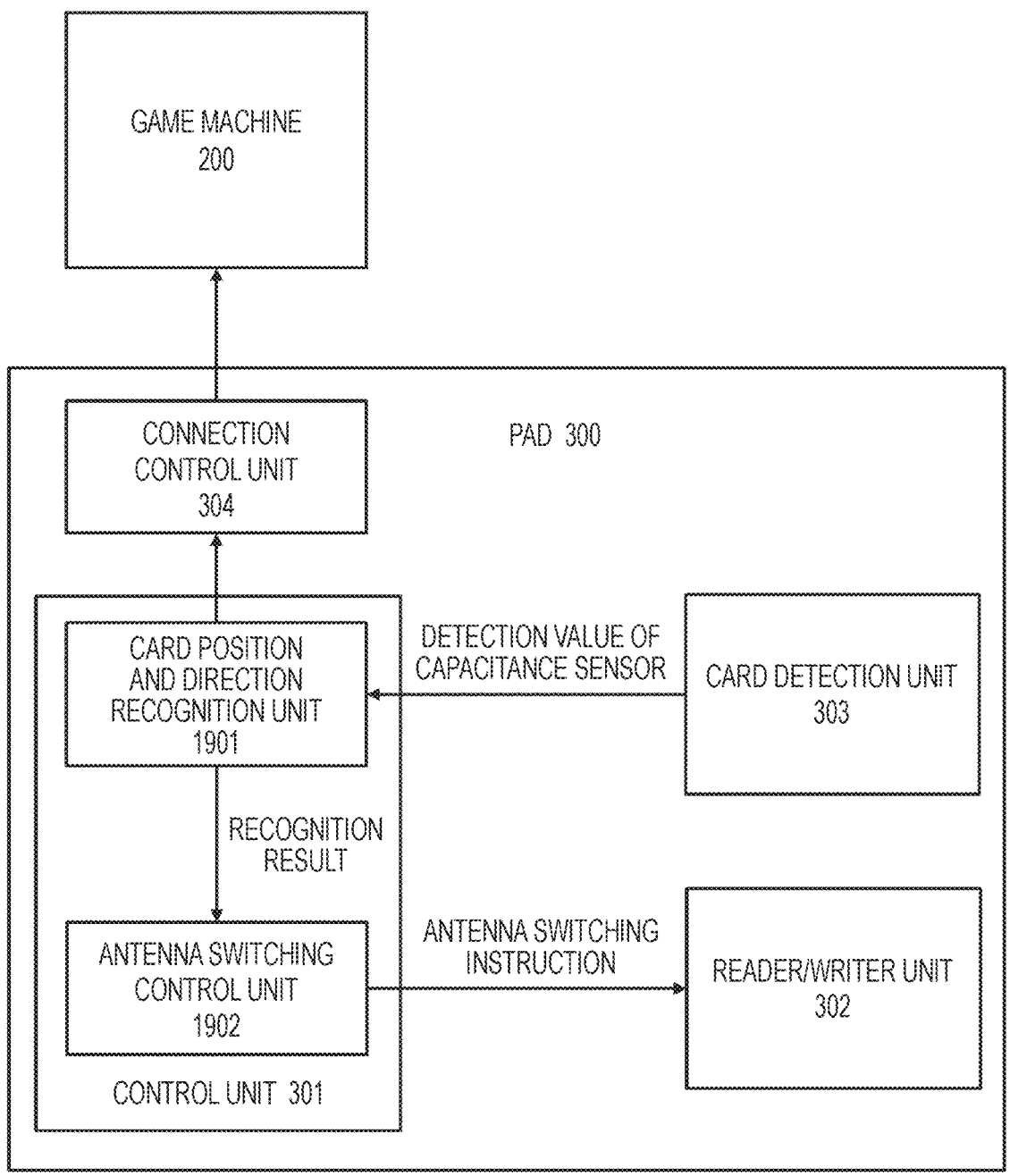
FIG. 19 is a diagram schematically illustrating a functional configuration of a control unit 301 in the pad 300.

FIG. 19 schematically illustrates a functional configuration for controlling communication with the RFID tag 401 by the reader/writer unit 302 on the basis of the detection result of the card detection unit 303 by the control unit 301 in the pad 300.

A card position and direction recognition unit 1901 inputs one-byte detection value of each of the capacitance sensors which are two-dimensionally arranged from the card detection unit 303 and executes processing for recognizing the position, the direction, and the inclination of the card 400 placed on the operation surface of the pad 300 on the basis of the two dimensional distribution of the detection values. Then, the card position and direction recognition unit 1901 outputs the recognition result to an antenna switching control unit 1902. Detailed procedures for recognizing the position, the direction, and the inclination of the card 400 by the card position and direction recognition unit 1901 will be described later.

The reader/writer unit 302 includes the plurality of antenna coils arranged in a two-dimensional array (as described above). The antenna switching control unit 1902 controls switching of the antenna coil used for communication with the card 400 placed on the operation surface of the pad 300 among the plurality of antenna coils included in the reader/writer unit 302 on the basis of the recognition result of the card position and direction recognition unit 1901. The reader/writer unit 302 switches an antenna coil to be used for the proximity wireless communication with the RFID tag 401 in response to a control signal from the antenna switching control unit 1902. In a case where the user is moving the card 400 on the operation surface of the pad 300, the antenna switching control unit 1902 switches the antenna coils in real time.

Furthermore, the card position and direction recognition unit 1901 outputs the recognition result regarding the position and the direction of the card 400 placed on the operation surface of the pad 300 to the game machine 200 via the connection control unit 304.

On the side of the game machine 200, the control unit 211 processes the recognition result regarding the position and the direction of the card 400 in time series so as to identify the operation on the card 400 performed on the pad 300 by the user such as to remove the card 400 from the pad 300, to change the position of the card 400, to move the card 400 to the upper side, the lower side, the left side, the right side, and in the oblique direction, to turn the card 400 on its side, and to reverse the card 400 (refer to FIGS. 4 to 8). Then, the control unit 211 performs an interaction according to the identified operation of the card 400 by using the video, the sound, and the like of the game.

Subsequently, a method for executing the processing for recognizing the position, the direction, and the inclination of the card 400 placed on the operation surface of the pad 300 by the card position and direction recognition unit 1901 in the control unit 301 by using the detection result of the card detection unit 303 will be described.

In the present embodiment, the card position and direction recognition unit 1901 executes the recognition processing on the card 400 in three steps including recognition of a rough position and direction, recognition of a detailed position, and inclination recognition. Here, the rough position recognition means to recognize the position of the card 400 with a resolution corresponding to an interval between the capacitance sensors of the card detection unit 303. Furthermore, the detailed position recognition means to recognize the position of the card 400 with a resolution less than the interval between the capacitance sensors. Processing in each step will be described in detail below.

(1) Step 1

In Step 1, a rough position of the card 400 placed on the pad 300 is recognized. The term "rough" means position recognition with a resolution about the interval between the capacitance sensors arranged in a two-dimensional array. Furthermore, in Step 1, the position is recognized by using a detection component of a metal portion such as the antenna coil of the RFID tag 401 of the detection values of the card detection unit 303, and a detection component of a non-metallic portion such as the card main body 402 including paper is not used. In other words, in Step 1, the card position and direction recognition unit 1901 executes the processing for recognizing the position of the card 400 after discarding the detection component of the non-metallic portion that is hard to be distinguished from a noise component from the detection values of the capacitance sensors input from the card detection unit 303 by using a predetermined threshold.

Figure 20:
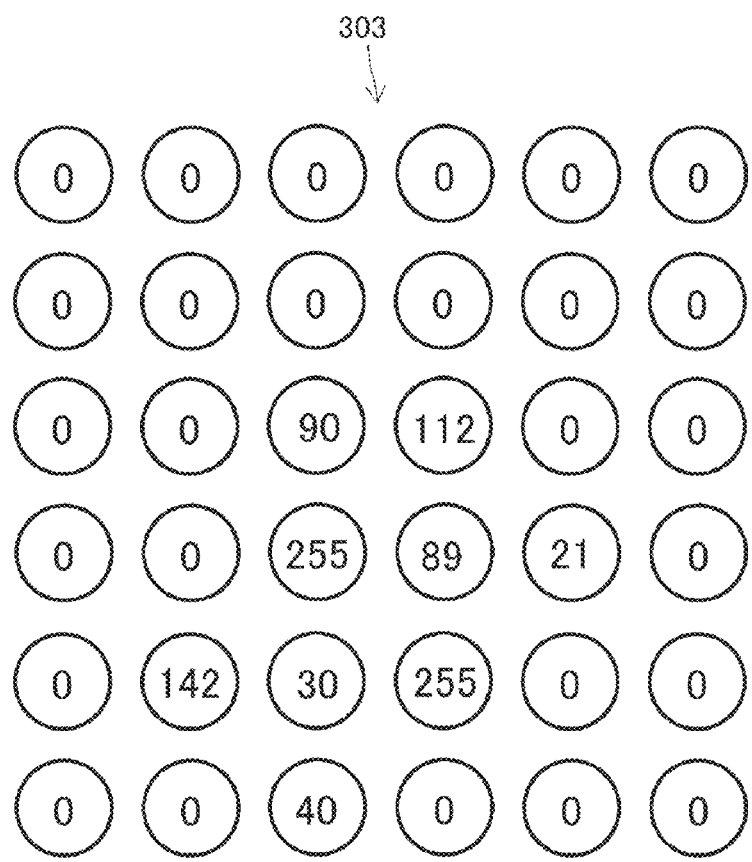
FIG. 20 is a diagram for explaining a processing method for recognizing a rough position of the card 400.

In FIG. 20, the detection values of the respective capacitance sensors of the card detection unit 303 after the processing for discarding the lower detection value has been executed are illustrated. Although the card detection unit 303 outputs the detection value indicating the detection level by a single byte from zero to 255 (as described above), in the example illustrated in FIG. 20, the detection value less than 20 is discarded as assuming the detection value as the noise component.

Processing for recognizing a rough position as assuming a case where the metal portion of the card 400 has about the same area as the capacitance sensors arranged in an n×m matrix (in illustrated example, three×three) will be described below. However, even if the area of the metal portion is other than three×three, it should be understood that the rough position can be recognized according to the processing procedure as described below.

Figure 21:
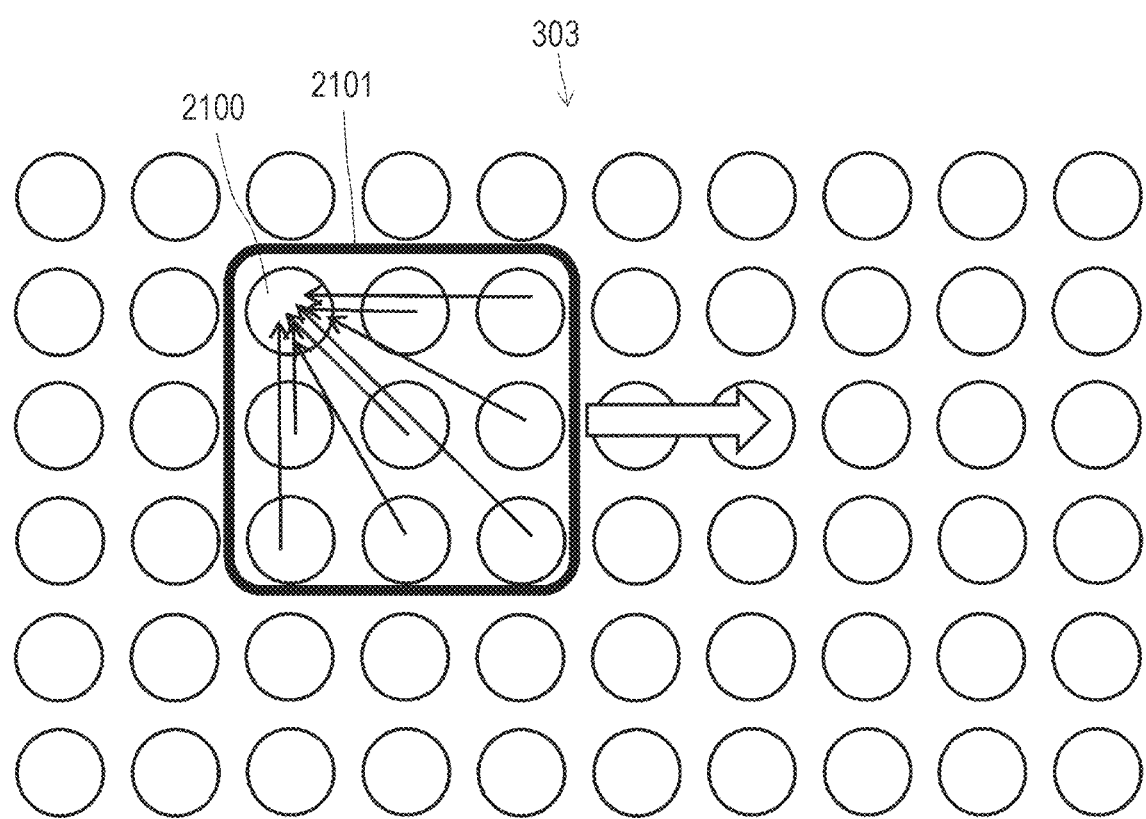
FIG. 21 is a diagram for explaining the processing method for recognizing a rough position of the card 400.

The capacitance sensors arranged in a two-dimensional array are scanned one by one from the upper left to the lower right of the card detection unit 303, and a score indicating a possibility that a corner of the card 400 is placed on the position of each capacitance sensor is sequentially obtained. In FIG. 21, a method for calculating a score of a capacitance sensor at a scanning position indicated by a reference number 2100 is illustrated. A total value of the detection values of the respective capacitance sensors in a three×three matrix 2101 including the capacitance sensor at a scanning position 2100 on the upper left side is calculated, and the total value is assumed as a score indicating a possibility that a corner of the card 400 is placed on the capacitance sensor 2100 at the scanning position.

Figure 22:
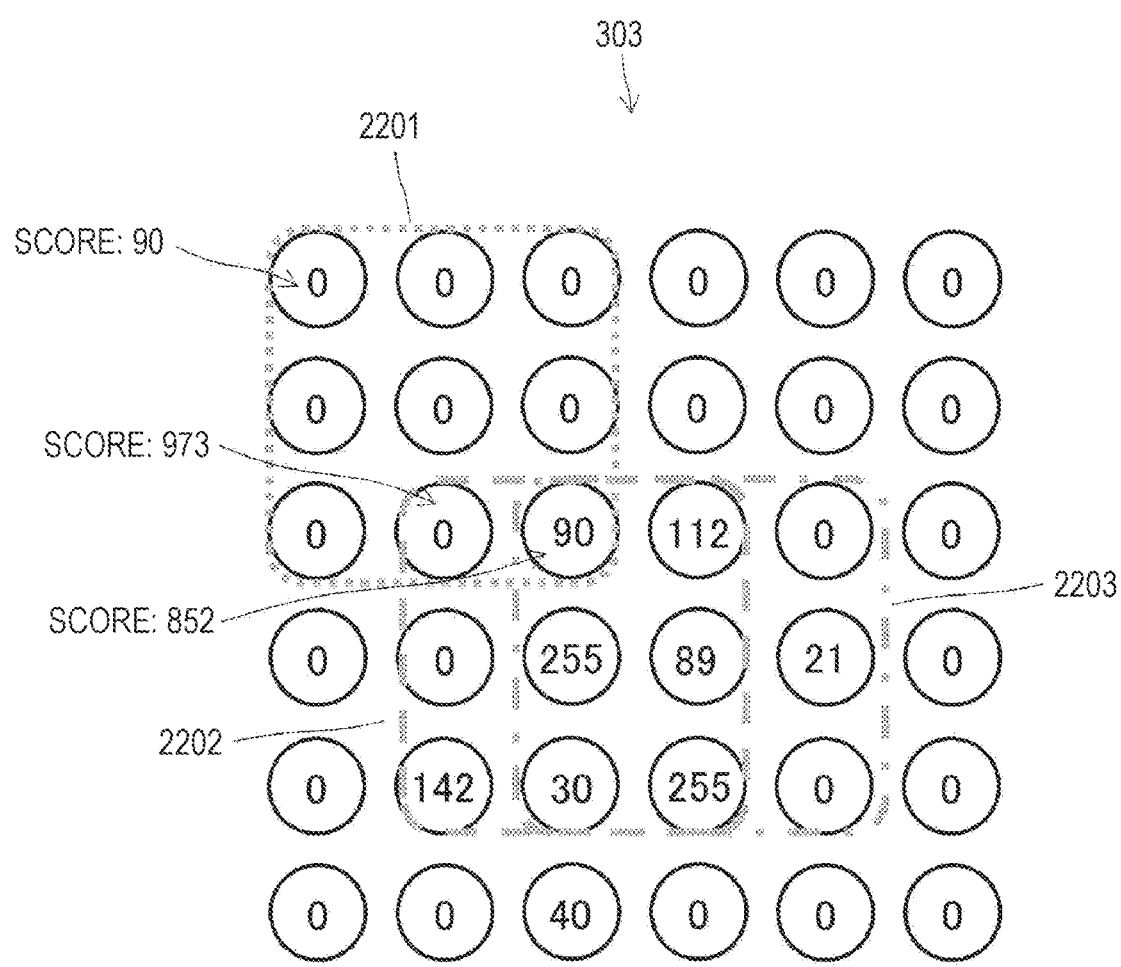
FIG. 22 is a diagram for explaining the processing method for recognizing a rough position of the card 400.

In FIG. 22, a result of obtaining the score at each scanning position by applying the calculation method illustrated in FIG. 21 to the detection example illustrated in FIG. 20 is illustrated. The total value of the detection values of the capacitance sensors in a three×three matrix indicated by a reference number 2201 is 90. Therefore, a score indicating a possibility that a corner of the antenna coil is placed on the position of the upper-right capacitance sensor at the scanning position 2201 is 90. Similarly, a total value of the detection values of the capacitance sensors in a three×three matrix indicated by a reference number 2202 is 973, and a score indicating a possibility that one corner of the antenna coil is placed on the position of the upper-right capacitance sensor in the matrix 2202 is 973. Furthermore, a total value of the detection values of the capacitance sensors in a three×three matrix indicated by a reference number 2203 is 852, and a score indicating a possibility that one corner of the antenna coil is placed on the position of the upper-right capacitance sensor in the matrix 2203 is 852.

Description regarding calculation results of all the scanning positions is omitted. However, the total value 973 of the detection values of the capacitance sensors in the three×three matrix indicated by the reference number 2202 is the largest score of all the scanning positions. Therefore, it can be recognized that the one corner of the antenna coil of the card 400 is placed on the position of the upper-right in the matrix 2202, in other words, the position of the capacitance sensor which is a second capacitance sensor from the left and a third capacitance sensor from the upper side of the two-dimensional array of the capacitance sensors.

Incidentally, the scanning position having the next highest score has the score 852 of the capacitance sensor indicated by the reference number 2203 and which is a third capacitance sensor from the left and a third capacitance sensor from the upper side. In a case where a card which has been previously found at the scanning position indicated by the reference number 2202 exists, when it is assumed that another card exists at this position 2203, this means that the cards are placed in a partially overlapped state. In the position recognition method described above, it is assumed that the cards be not overlapped and that the card is not placed on this scanning position.

With the position recognition method described above, all the cards 400 placed on the pad 300 are found in order from the scanning position with the higher score until the score falls below a threshold. However, it is assumed that the two or more cards be simultaneously placed on the operation surface of the pad 300. However, it is assumed that the cards be placed without being overlapped with each other.

After recognizing the rough position of the card 400 placed on the pad 300, a rough direction of the card 400 is further obtained by using the detection result of the card detection unit 303 which has executed the processing for discarding the lower detection value (refer to FIG. 20).

Here, it is assumed that the antenna coil of the RFID tag 401 have a rectangular shape which is long in the long side of the card 400, not a square shape. Furthermore, a state where the long side of the card 400 is vertically placed is a vertically placed state, and a state where the long side of the card 400 is horizontally placed is a horizontally placed state. Then, a method for recognizing whether the card 400 is vertically or horizontally placed as the rough direction of the card 400 will be described below.

As the recognition result of the rough position of the card 400 placed on the pad 300, a matrix of three×three capacitance sensors having a high possibility that the card 400 is placed on the matrix is extracted. In the example illustrated in FIG. 22, a three×three matrix indicated by the reference number 2202 is extracted (refer to FIG. 23).

Figure 23:
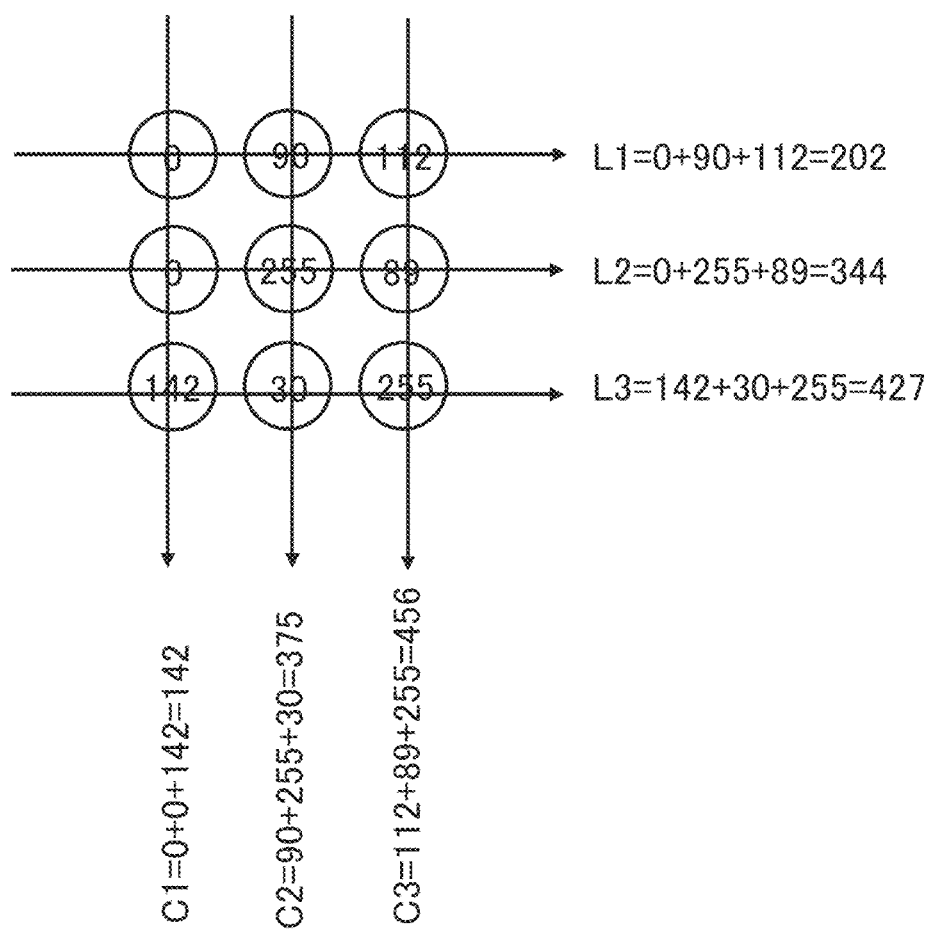
FIG. 23 is a diagram for explaining a processing method for recognizing a rough direction of the card 400.

In the processing for recognizing the rough direction of the card 400, as illustrated in FIG. 23, a total value of the detection values of the capacitance sensors is calculated for each row, and the total values are assumed as L1, L2, and L3. Next, two of L1, L2 and L3 having larger values are added, and this is assumed as a horizontal score HS. In the example illustrated in FIG. 23, L1=0+90+112=202, L2=0+255+89=344, and L3=142+30+255=427. Two larger values L2 and L3 are added, and the horizontal score HS=L2+L3=771 is obtained.

Furthermore, a total value of the detection values of the capacitance sensors is calculated for each column, and the total values are assumed as C1, C2, and C3. The two of C1, C2, and C3 having larger values are added, and this is assumed as a vertical score VS. In the example illustrated in FIG. 23, C1=0+0+142=142, C2=90+255+30=375, and C3=112+89+255=456. Two larger values C2 and C3 are added, and the vertical score VS=C2+C3=831 is obtained.

Then, if the vertical score VS is larger than the horizontal score HS, it is determined that the card 400 is vertically placed. If the HS is larger than the VS, it is determined that the card 400 is horizontally placed. In the example illustrated in FIG. 23, since the vertical score VS (=831) is larger than the horizontal score HS (=771), it is determined that the card 400 is vertically placed.

It is obvious from the shapes of the card 400 and the antenna coils that it can be determined whether the card 400 is vertically or horizontally placed on the basis of the comparison between the vertical score VS and the horizontal score HS.

Moreover, by comparing a difference between the vertical score VS and the horizontal score HS with a predetermined threshold, a rough inclination of the card 400 can be recognized. For example, in a case where the card 400 is placed on the pad 300 in an oblique direction, the difference between the vertical score VS and the horizontal score HS is decreased. Therefore, it is possible to recognize that the card 400 is obliquely placed when the difference is equal to or less than the predetermined threshold.

(2) Step 2

In Step 2, the detailed position of the card 400 placed on the pad 300 is recognized. However, Step 2 is performed as assuming that the rough position and direction of the card 400 have been already recognized in Step 1. Here, "detailed" means position recognition with a resolution less than the interval between the capacitance sensors arranged in a two-dimensional array. In other words, in Step 2, the position is recognized with the resolution less than the interval between the capacitance sensors including a deviation in the interval between the capacitance sensors from the rough position recognized with the resolution corresponding to the interval between the capacitance sensors in Step 1.

Furthermore, in Step 2, to recognize the detailed position, the card position and direction recognition unit 1901 executes the processing for recognizing the position of the card 400 without discarding the detection component of the non-metallic portion less than the predetermined threshold from the detection value of each capacitance sensor input from the card detection unit 303. The detection value on which the discarding processing is not executed includes a detection value responded to the non-metallic card main body 402 including paper and the like. Therefore, in Step 2, the detailed position of the card 400 is recognized by using not only the detection value of the metal portion of the card 400 such as the antenna coils but also the detection value of the non-metallic portion of the card main body 402 including paper and the like.

Figure 24:
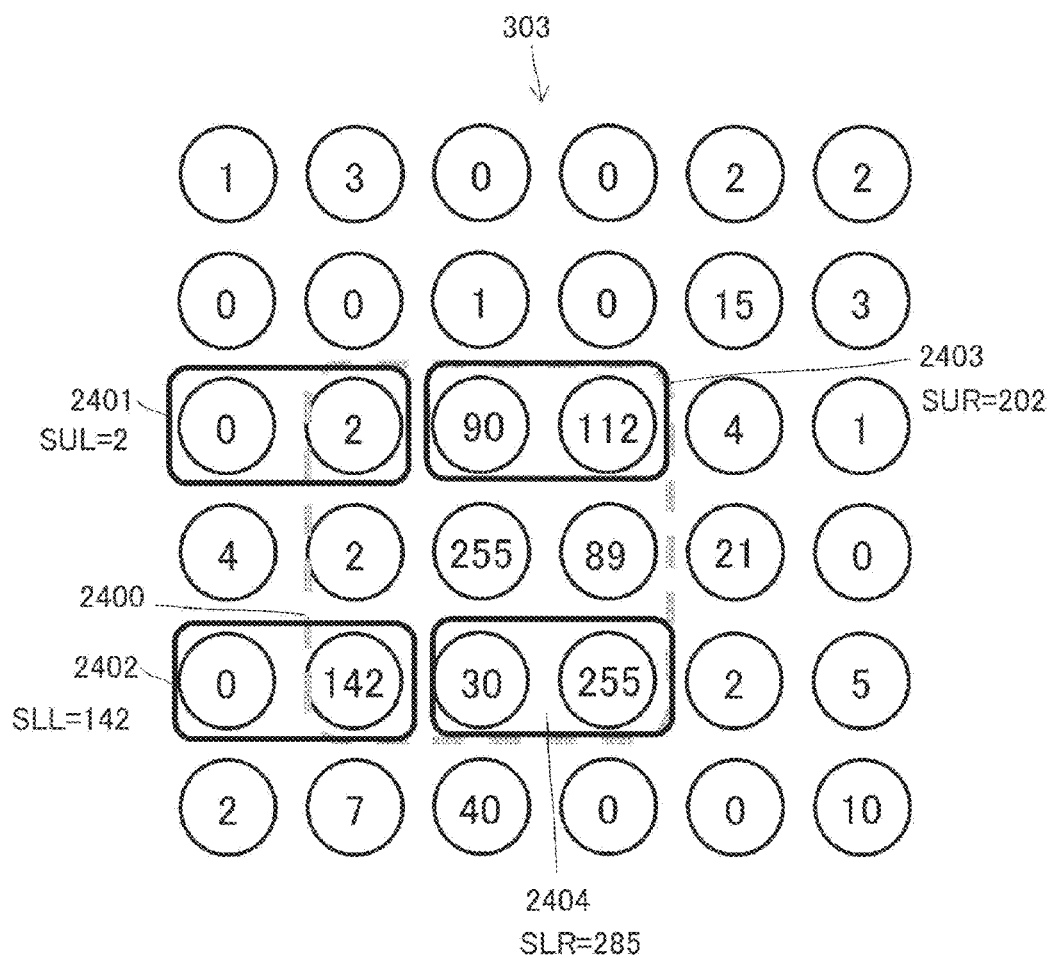
FIG. 24 is a diagram for explaining a processing method for recognizing a detailed position of the card 400.

In FIG. 24, the detection values of the respective capacitance sensors of the card detection unit 303 on which the processing for discarding the detection value less than the predetermined threshold is not executed are illustrated. The card detection unit 303 outputs the detection value indicating the detection value by a single byte from zero to 255 (as described above). However, in the example illustrated in FIG. 24, the detection value less than 20 is used for detailed position recognition processing without discarding the detection value less than 20 as assuming that the detection value be the component of the non-metallic portion of the card main body 402.

Processing for recognizing the detailed position as assuming a case where the metal portion of the card 400 has about the same area as three×three capacitance sensors (as described above) will be described below. However, even if the area of the metal portion is other than three×three, it should be understood that the detailed position can be recognized according to the processing procedure as described below.

In Step 1, as the position of the card 400, a three×three matrix indicated by a reference number 2400 in FIG. 24 has been already recognized. The matrix 2400 is a rough position recognized in units about the same as the interval between the capacitance sensors. In the following Step 2, the detailed position of the card 400 including the deviation in the interval between the capacitance sensors from the roughly recognized position is recognized.

In Step 2, a plurality of capacitance sensors to be feature points is extracted from among a plurality of capacitance sensor groups on which the card 400 is placed at the roughly recognized position, and a total value of detection values of capacitance sensors is calculated for each region including the feature points. Then, the detailed position of the card 400 is recognized with the resolution less than the interval between the capacitance sensors on the basis of the result of the comparison between the total values of the regions in the vertical direction and the horizontal direction.

Specifically, four points on the upper left, upper right, lower left, and lower right are extracted from the matrixes 2400 recognized in Step 1 as the feature points. Then, by using the total value of the detection values of the capacitance sensors in a region near each of the feature points on the upper left, upper right, lower left, and lower right respectively indicated by reference numbers 2401 to 2404, the detailed position of the card 400 is recognized with the resolution less than the interval between the capacitance sensors.

In the example illustrated in FIG. 24, each of the regions indicated by the reference numbers 2401 to 2404 includes two capacitance sensors which exist near each of the feature points positioned at the four corners of the position 2400 of the card 400 which has been roughly recognized. The detection value of each capacitance sensor included in the regions 2401 to 2404 on which the discarding processing is not executed includes the detection value at the time when the card 400 is not placed or the detection value responded to the non-metallic card main body 402 including paper and the like.

However, any method can be used as a method for defining the position and the size of each of the regions 2401 to 2404 including the feature points other than that the capacitance sensor at any one of the corners of the position 2400 of the card 400 which has been roughly recognized is included as the feature point. Each of the regions 2401 to 2404 may be defined by only the single capacitance sensor corresponding to the feature point such as one corner of the position 2400 of the card 400 which has been roughly recognized or three or more capacitance sensors including the capacitance sensor corresponding to the feature point.

First, total values SUL, SUR, SLL, and SLR of the detection values of the capacitance sensors are calculated for the respective regions 2401 to 2404 including the feature points on the upper left, upper right, lower left, and lower right, and the calculated total value is assumed as a score indicating a possibility that one corner of the card 400 is placed on the each of the regions 2401 to 2404. In the illustrated example, SUL=2, SUR=202, SLL=142, and SLR=285.

It can be estimated that, in the region having a larger detection value, an area of the card 400 having contact with the sensor is wide. Furthermore, it can be estimated that, in the region having a smaller detection value, the area of the card 400 having contact with the sensor is small. Therefore, it can be estimated that the card 400 is placed closer to the region having a larger detection value.

For example, if SUL>SLL or SUR>SLR is satisfied, it is estimated that the card 400 is positioned on the upper side of the roughly-recognized position 2400, and conversely, if SUL<SLL or SUR<SLR is satisfied, it is estimated that the card 400 is positioned on the lower side of the roughly-recognized position 2400. Similarly, if SUL>SUR or SLL>SLR is satisfied, it is estimated that the card 400 is positioned on the left side of the roughly-recognized position 2400, and conversely, if SUL<SUR or SLL<SLR is satisfied, it is estimated that the card 400 is positioned on the right side of the roughly-recognized position 2400.

Therefore, deviations less than the interval between the capacitance sensors in the vertical direction (longitudinal direction) and the horizontal direction (lateral direction) of the card 400 can be respectively calculated on the basis of the following expressions (1) and (2). However, in the following expression (1), a positive value means an upward deviation, and a negative value means a downward deviation. Furthermore, in the following expression (2), a positive value means a leftward deviation, and a negative value means a rightward deviation.

[Formula 1]

DEVIATION IN VERTICAL DIRECTION: (1)

$$\frac{(SUL - SLL) \times \text{INTERVAL BETWEEN SENSORS IN VERTICAL DIRECTION}}{\text{Max}[SUL, SLL]}$$

DEVIATION IN HORIZONTAL DIRECTION: (2)

$$\frac{(SUL - SUR) \times \text{INTERVAL BETWEEN SENSORS IN HORIZONTAL DIRECTION}}{\text{Max}[SUL, SUR]}$$

Then, the detailed position of the card 400 can be recognized by adding the deviations in the vertical and the horizontal directions of the card 400, less than the interval between the capacitance sensors, calculated by the expressions (1) and (2) to the position of the card 400, obtained in Step 1, which has been roughly recognized in units corresponding to the interval between the capacitance sensors.

In the example illustrated in FIG. 24, the calculation result of the expression (1) is (2−142)/142=−0.986, and the card 400 is deviated downward by 0.986 than the roughly-recognized position 2400. However, the value indicating the deviation is indicated as assuming that an interval between the capacitance sensors in the vertical direction is one unit, and a fractional value calculation result means that the deviation is less than the interval between the capacitance sensors in the vertical direction.

Furthermore, the calculation result of the expression (2) is (2−202)/202=−0.99, and the card 400 is deviated rightward by 0.99 than the roughly-recognized position 2400. However, the value indicating the deviation is indicated as assuming that an interval between the capacitance sensors in the horizontal direction is one unit, and a fractional value calculation result means that the deviation is less than the interval between the capacitance sensors in the horizontal direction.

(3) Step 3

In Step 1, the rough position of the card 400 placed on the pad 300 with the resolution corresponding to the interval between the capacitance sensors and the direction of the card 400 (vertically placed or horizontally placed) are recognized. In the subsequent Step S2, the deviations in the vertical direction and the horizontal direction of the card 400 with respect to the rough position recognized in Step 1, in other words, the detailed position with the resolution less than the interval between the capacitance sensors is recognized. Then, in Step 3, detailed inclination of the card 400 placed on the pad 300 is recognized.

However, the following description will be made while the inclination of the card 400 which is vertically placed is defined as zero degrees, and rotation of the card 400 in the clockwise direction is defined as an inclination 6 in the positive direction.

In Step 3, since the inclination of the card 400 is recognized with the resolution less than the interval between the capacitance sensors arranged in a two-dimensional array, as in Step 2, the card position and direction recognition unit 1901 executes the processing for recognizing the position of the card 400 without discarding the detection component of the non-metallic portion less than the predetermined threshold from the detection value of each capacitance sensor input from the card detection unit 303. The detection value on which the discarding processing is not executed includes a detection value responded to the non-metallic card main body 402 including paper and the like. Therefore, in Step 3, the detailed direction of the card 400 is recognized by using not only the detection value of the metal portion of the card 400 such as the antenna coils but also the detection value of the non-metallic portion of the card main body 402 including paper and the like.

Figure 25:
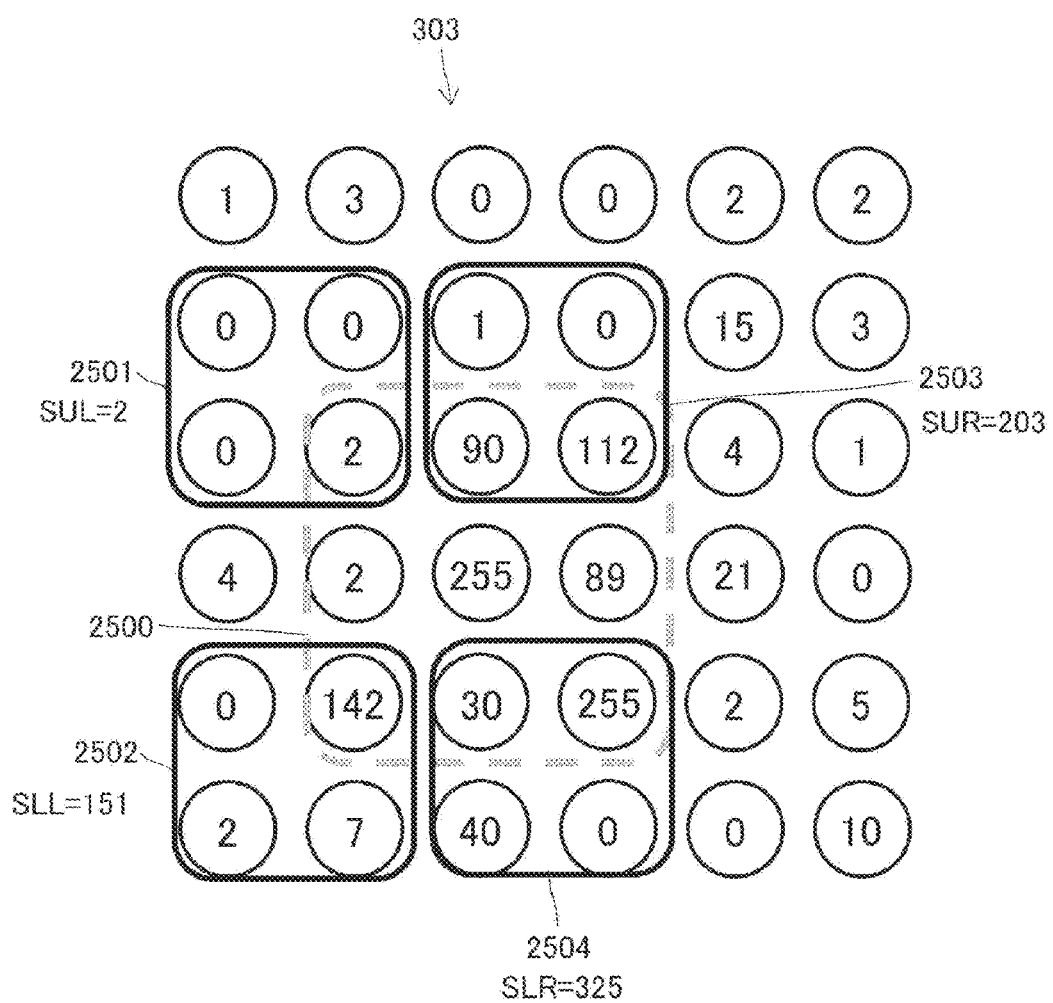
FIG. 25 is a diagram for explaining a processing method for recognizing a detailed direction of the card 400.

In FIG. 25, the detection values of the respective capacitance sensors of the card detection unit 303 on which the processing for discarding the detection value less than the predetermined threshold is not executed are illustrated (as in FIG. 24). The card detection unit 303 outputs the detection value indicating the detection value by a single byte from zero to 255 (as described above). However, in the example illustrated in FIG. 25, the detection value less than 20 is used for recognition processing of the detailed direction of the card 400 without discarding the detection value less than 20 as assuming that the detection value be the component of the non-metallic portion of the card main body 402.

In Step 1, as the position of the card 400, a three×three matrix indicated by a reference number 2500 in FIG. 25 has been already recognized. The matrix 2500 is a rough position recognized in units about the same as the interval between the capacitance sensors. In Step 3, the detailed direction of the card 400 is recognized with the resolution less than the interval between the capacitance sensors by using the detection values of the capacitance sensors in the regions near four points on the upper left, upper right, lower left, and lower right indicated by reference numbers 2501 to 2504 in the matrix 2500 recognized in Step 1.

In Step 3, a plurality of capacitance sensors to be feature points is extracted from among a plurality of capacitance sensor groups on which the card 400 is placed at the roughly recognized position, and a total value of detection values of capacitance sensors is calculated for each region including each feature point. Then, the regions respectively including the feature points are divided into left and right portions, and a difference between the total values in the left region and a difference between the total values in the right region are obtained. Then, the differences in the left region and the right region are compared, and, on the basis of the above comparison, the detailed direction of the card 400 is recognized with the resolution less than the interval between the capacitance sensors.

Specifically, four points on the upper left, upper right, lower left, and lower right are extracted from the matrix 2500 recognized in Step 1 as the feature points. Then, the total value of the detection values of the capacitance sensors in the region near each of the four feature points on the upper left, the upper right, the lower left, and the lower right indicated by the reference numbers 2501 to 2504 is calculated, the difference between the total values in the left regions and the difference between the total values in the right regions are obtained, and the detailed direction of the card 400 is recognized with the resolution less than the interval between the capacitance sensors.

In the example illustrated in FIG. 25, the regions indicated by the reference numbers 2501 to 2504 respectively include four capacitance sensors which exist near the feature points positioned at the four corners of the position 2500 of the card 400 which has been roughly recognized. The detection value of each capacitance sensor included in the regions 2501 to 2504 on which the discarding processing is not executed includes the detection value at the time when the card 400 is not placed or the detection value responded to the non-metallic card main body 402 including paper and the like.

However, any method can be used as a method for defining each of the regions 2501 to 2504 other than that the capacitance sensor at any one of corners of the position 2500 of the card 400 which has been roughly recognized is included. Each of the regions 2501 to 2504 may be defined by only equal to or less than three capacitance sensors including the capacitance sensor corresponding to one corner of the position 2500 of the card 400 which has been roughly recognized or five or more capacitance sensors including the capacitance sensor corresponding to one corner.

First, total values SUL, SUR, SLL, and SLR of the detection values of the capacitance sensors are calculated for the respective regions 2501 to 2504 on the upper left, the upper right, the lower left, and the lower right, and the calculated total value is assumed as a score indicating a possibility that one corner of the card 400 is placed on the each of regions 2501 to 2504. In the illustrated example, SUL=2, SUR=203, SLL=151, and SLR=325.

It can be estimated that, in the region having a larger detection value, an area of the card 400 having contact with the sensor is wide. Furthermore, it can be estimated that, in the region having a smaller detection value, the area of the card 400 having contact with the sensor is small. Therefore, it can be estimated that the overlapping area is increased because the card 400 is inclined to the region with the larger detection value.

For example, in a case where the card 400 is inclined by an angle θ in a clockwise direction with respect to the position 2500 roughly recognized in Step 1, the card 400 is positioned closer to the regions 2502 and 2503 than the position 2500 which has been roughly recognized and is separated from the regions 2501 and 2504. However, it is assumed that a displacement of the card 400 from the position 2500 by the inclination 6 be less than the interval between the capacitance sensors. As a result, while the scores SUR and SLL of the respective regions 2502 and 2503 increase, and the scores SUL and SLR of the respective regions 2501 and 2504 decrease.

Therefore, the inclination of the card 400 less than the interval between the capacitance sensors can be calculated on the basis of the following expression (3). However, in the following expression (3), a positive value means the inclination in the clockwise direction, and a negative value means the inclination in the counterclockwise direction.

[Formula 2]

$$\theta = \frac{(SUR - SLR) - (SUL - SLL)}{\text{Max}[SUL \cdot SUL, SLL, SLR]} \times 45 \quad (3)$$

In the example illustrated in FIG. 25, the calculation result of the expression (3) is 3.7 [deg], and the card 400 is inclined in the clockwise direction by 3.7 deg from the position 2500 which has been roughly recognized. Note that, in a case where the direction of the card 400 estimated in Step 1 is the vertical direction, the value calculated in the expression (3) is the inclination of the card 400. On the other hand, in a case where the direction of the card estimated in Step 1 is the horizontal direction, a value obtained by subtracting the value calculated in the expression (3) from 90 [deg] is the inclination of the card 400.

It should be fully understood that the direction of the card 400 in units of one degree can be recognized, in addition to the detailed position of the card 400 in the vertical and horizontal directions, according to the processing in Step 3.

According to the technology disclosed in the present specification, the position and the direction of the placed card 400 are detected by using the card detection unit 303 in which the capacitance sensors are arranged in a two-dimensional array. First, after the detection value less than the predetermined threshold is discarded and the position and the direction of the card 400 are roughly recognized with the resolution corresponding to the interval between the capacitance sensors, the position and the direction of the card 400 can be recognized in detail with the resolution less than the interval between the capacitance sensors by using the detection value less than the predetermined threshold.

In short, according to the technology disclosed in the present specification, the position and the direction of the card 400 can be recognized with a higher resolution while minimizing the number of capacitance sensors arranged in the card detection unit 303 and reducing the cost.

INDUSTRIAL APPLICABILITY

The technology disclosed in the present specification has been described above in detail with reference to the specific embodiment. However, it is obvious that those skilled in the art can amend and substitute the embodiment without departing from the scope of the technology disclosed in the present specification.

In the present specification, the embodiment has been mainly described in which the technology disclosed in the present specification is applied to the pad connected to the game machine (or information terminal such as smartphone and tablet which executes game application). However, the gist of the technology disclosed in the present specification is not limited to this. The technology disclosed in the present specification can be similarly applied to a pad connected to an information terminal which executes applications other than the game and a pad which reads a card used for applications other than the game.

In a word, the technology disclosed in the present specification has been described as an example, and the described matter in the present specification should not be restrictively interpreted. Claims should be considered in order to determine the scope of the technology disclosed in the present specification.

Note that the technology disclosed in the present specification can have the following configuration.

(1) An information processing apparatus including:

a detection unit including a plurality of capacitance sensors arranged in a two-dimensional array along an operation surface; and a recognition unit configured to recognize an object placed on the operation surface on the basis of distribution of detection values of the respective capacitance sensors.

(2) The information processing apparatus according to (1), in which the recognition unit recognizes a first position of an object on the basis of distribution of detection values of the respective capacitance sensors in which a detection value less than a predetermined threshold is discarded.

(3) The information processing apparatus according to (2), in which the recognition unit recognizes a position of a matrix of which a total of the detection values of the capacitance sensors is maximum or exceeds a predetermined threshold among matrixes of capacitance sensors having an area about the same as an area of a metal portion included in an object as the first position of the object.

(4) The information processing apparatus according to (3), in which the recognition unit executes recognition processing of the first positions of all the objects until the total of the detection values falls below a predetermined threshold.

(5) The information processing apparatus according to any one of (2) to (4), in which the recognition unit recognizes the first position of the object as assuming that two or more objects are placed without overlapping with each other.

(6) The information processing apparatus according to any one of (2) to (5), in which the recognition unit further recognizes a first direction of the object at the first position on the basis of the distribution of the detection values of the respective capacitance sensors in which the detection value less than the predetermined threshold is discarded.

(7) The information processing apparatus according to (6), in which the recognition unit recognizes whether the object is placed vertically or horizontally as the first direction on the basis of a result of comparison between a total value of detection values for each row and a detection value for each column in the matrix of the capacitance sensors on which it is recognized that the object is placed at the first position.

(8) The information processing apparatus according to any one of (2) to (7), in which the recognition unit recognizes a second position including a deviation in the interval between the capacitance sensors from the first position of the object on the basis of distribution of the detection values of all the capacitance sensors in which the detection value less than the predetermined threshold is not discarded.

(9) The information processing apparatus according to (8), in which the recognition unit extracts a plurality of capacitance sensors to be feature points from among a plurality of capacitance sensor groups on which the object is placed at the first position, calculates a total value of the detection values of the capacitance sensors for each region including each feature point, and recognizes the second position of the object on the basis of a result of comparing the total values of the respective regions.

(10) The information processing apparatus according to any one of (2) to (9), in which the recognition unit further recognizes a second direction of the object at the second position on the basis of the distribution of the detection values of all the capacitance sensors in which the detection value less than the predetermined threshold is not discarded.

(11) The information processing apparatus according to (10), in which the recognition unit extracts a plurality of capacitance sensors to be feature points from among a plurality of capacitance sensor groups on which the object is placed at the first position, calculates a total value of the detection values of the capacitance sensors for each region including each feature point, and recognizes the second direction of the object on the basis of a result of dividing the regions including the respective feature points into a left and right portions and comparing a difference between the total values in the left regions and a difference between the total values in the right regions.

(12) The information processing apparatus according to any one of (1) to (11), further including:
a connection unit configured to connect to an external device, in which
a recognition result by the recognition unit is notified to the external device via the connection unit.

(13) The information processing apparatus according to any one of (1) to (12), further including:
a reader/writer unit having a plurality of antenna coils; and
a control unit configured to switch the antenna coils used for proximity wireless communication with a RFID tag included in the object on the basis of the recognition result by the recognition unit.

(14) The information processing apparatus according to (13), further including:
a connection unit configured to connect to an external device, in which
the reader/writer unit transmits information read from the RFID tag from the connection unit to the external device or records information received from the external device via the connection unit to the RFID tag.

(15) A control method of an information processing apparatus including a detection unit including a plurality of capacitance sensors arranged in a two-dimensional array along an operation surface, the method including:
a recognition step for recognizing an object placed on the operation surface on the basis of distribution of detection values of the respective capacitance sensors.

REFERENCE SIGNS LIST

100 Information processing system
200 Game machine (information terminal such as smartphone and tablet)
201 Screen
211 Control unit
212 Display unit
213 Sound output unit
214 Input unit
215 Network connection unit
216 Connection control unit
300 Pad
301 Control unit
302 Reader/writer unit
303 Card detection unit
304 Connection control unit
400 Card
401 RFID tag
402 Card main body
500 Server
501 User authentication unit
502 Product registration unit
503 Payment processing unit
504 Transaction management unit
505 Card authentication unit
506 Card writing unit
1101 Processing unit
1102 Antenna resonant circuit
1111 Processing unit
1112 Antenna resonant circuit
1113 Load switching modulation circuit
1901 Card position and direction recognition unit
1902 Antenna switching control unit

The invention claimed is:
1. An information processing apparatus, comprising:
a detection unit including a plurality of capacitance sensors arranged in a two-dimensional array along an operation surface; and
a recognition unit configured to:
recognize a first position of an object on the operation surface, based on a distribution of a plurality of detection values of the plurality of capacitance sensors, wherein
a first detection value of the plurality of detection values that is less than a specific threshold is discarded for the recognition of the first position;
extract a set of capacitance sensors, from the plurality of capacitance sensors, to be a plurality of feature points, wherein
the object is on the set of capacitance sensors at the first position,
calculate a total value of the plurality of detection values for each region of a plurality of regions, wherein
each region includes the plurality of feature points; and
recognize a second direction of the object at a second position of the object, based on
a result of division of the plurality of regions into a left portion and a right portion, and
comparison of a first difference between a first plurality of total values in first regions of the left portion and a second difference between a second plurality of total values in second regions of the right portion, wherein
the first detection value of the plurality of detection values that is less than the specific threshold is not discarded for the recognition of the second position.

2. The information processing apparatus according to claim 1, wherein
the recognition unit is further configured to recognize a position of a matrix, of a plurality of matrixes that includes the plurality of capacitance sensors, as the first position of the object, wherein
the total value of the plurality of detection values of the matrix is one of maximum or exceeds the specific threshold, and
the matrix has a first area substantially equal to a second area of a metal portion included in the object.

3. The information processing apparatus according to claim 2, wherein
the recognition unit is further configured to execute a recognition processing operation of the first position of each object of a plurality of objects until the total value, of the plurality of detection values, of a specific region falls below the specific threshold, wherein
the plurality of objects includes the object.

4. The information processing apparatus according to claim 1, wherein
the recognition unit is further configured to recognize the first position of the object when at least two objects of a plurality of objects are placed without overlapping with each other, and
the at least two objects include the object.

5. The information processing apparatus according to claim 1, wherein
the recognition unit is further configured to recognize a first direction of the object at the first position, based on the distribution of the plurality of detection values of the plurality of capacitance sensors, and the first detection value of the plurality of detection values that is less than the specific threshold is discarded for the recognition of the first direction.

6. The information processing apparatus according to claim 5, wherein the recognition unit is further configured to recognize whether the object is placed vertically or horizontally as the first direction, based on a result of comparison between a total value of detection values for each row and a total value of detection values for each column in a matrix of the set of capacitance sensors.

7. The information processing apparatus according to claim 1, wherein the recognition unit is further configured to recognize the second position including a deviation in an interval between the plurality of capacitance sensors from the first position of the object, based on the distribution of the plurality of detection values, of the plurality of capacitance sensors, in which the first detection value less than the specific threshold is not discarded.

8. The information processing apparatus according to claim 1, further comprising:

a connection unit configured to connect to an external device, wherein a recognition result by the recognition unit is notified to the external device via the connection unit.

9. The information processing apparatus according to claim 1, further comprising:

a reader/writer unit having a plurality of antenna coils; and a control unit configured to switch the plurality of antenna coils used for proximity wireless communication with a RFID tag included in the object, based on a recognition result by the recognition unit.

10. The information processing apparatus according to claim 9, further comprising:

a connection unit configured to connect to an external device, wherein the reader/writer unit is further configured to:

transmit information, read from the RFID tag, via the connection unit to the external device; and record the information received, from the external device, via the connection unit to the RFID tag.

11. A control method of an information processing apparatus, comprising:

recognizing, by a recognition unit, a first position of an object on an operation surface, based on a distribution of a plurality of detection values of the plurality of capacitance sensors, wherein a first detection value of the plurality of detection values that is less than a specific threshold is discarded for the recognition of the first position;

extracting, by the recognition unit, a set of capacitance sensors, from the plurality of capacitance sensors, to be a plurality of feature points, wherein the plurality of capacitance sensors is arranged in a two-dimensional array along the operation surface the object is on the set of capacitance sensors at the first position, calculating, by the recognition unit, a total value of the plurality of detection values for each region of a plurality of regions, wherein each region includes the plurality of feature points; and recognizing, by the recognition unit, a second direction of the object at a second position of the object based on a result of division of the plurality of regions into a left portion and a right portion, and comparison of a first difference between a first plurality of total values in first regions of the left portion and a second difference between a second plurality of total values in second regions of the right portion, wherein the first detection value of the plurality of detection values that is less than the specific threshold is not discarded for the recognition of the second position.

* * * * *